United States Patent
Kim

(10) Patent No.: US 12,167,471 B2
(45) Date of Patent: Dec. 10, 2024

(54) METHOD AND APPARATUS FOR RANDOM ACCESS RESOURCE SELECTION IN MOBILE WIRELESS COMMUNICATION SYSTEM

(71) Applicants: BLACKPIN Inc., Seoul (KR); Soenghun Kim, Hanam-si (KR); SIGNALIS CO., LTD., Daejeon (KR)

(72) Inventor: Soenghun Kim, Hanam-si (KR)

(73) Assignees: BLACKPIN Inc., Seoul (KR); Soenghun Kim, Hanam-si (KR); SIGNALS CO., LTD., Daejeon (KR)

( * ) Notice: Subject to any disclaimer, the term of this patent is extended or adjusted under 35 U.S.C. 154(b) by 0 days.

(21) Appl. No.: 18/657,803

(22) Filed: May 8, 2024

(65) Prior Publication Data

US 2024/0381433 A1    Nov. 14, 2024

(30) Foreign Application Priority Data

May 8, 2023    (KR) .................. 10-2023-0058936

(51) Int. Cl.
*H04W 74/08*    (2024.01)
*H04W 74/00*    (2009.01)
*H04W 74/0833*    (2024.01)

(52) U.S. Cl.
CPC ..... *H04W 74/0833* (2013.01); *H04W 74/004* (2013.01)

(58) Field of Classification Search
CPC ..................... H04W 74/0833; H04W 72/21
USPC ........................................... 370/329
See application file for complete search history.

(56) References Cited

U.S. PATENT DOCUMENTS

| | | | |
|---|---|---|---|
| 2023/0262815 A1* | 8/2023 | Agiwal | H04W 74/0841 370/329 |
| 2024/0008050 A1* | 1/2024 | Zhou | H04W 74/006 |

OTHER PUBLICATIONS

3GPP TS 38.321 V17.4.0 (Mar. 2023); Technical Specification; 3rd Generation Partnership Project; Technical Specification Group Radio Access Network; NR; Medium Access Control (MAC) protocol specification (Release 17).

(Continued)

*Primary Examiner* — Kiet M Doan
(74) *Attorney, Agent, or Firm* — PnK IP LLC

(57) ABSTRACT

A wireless device may receive system information block 1 (SIB1) message of a cell. The SIB1 message may indicate a plurality of configuration parameters comprising a common uplink configuration of an uplink bandwidth part (BWP). The common uplink configuration of the uplink BWP may comprise: a common random access channel (RACH) configuration, a threshold for determining whether to select a resource associated with a physical random access channel (PRACH) preamble repetition number, and a second RACH configuration associated with feature combination. The second RACH configuration may indicate the PRACH preamble repetition number. The wireless device may determine, based on the threshold and based on the PRACH preamble repetition number, a repetition number for PRACH preamble transmission, and repeatedly transmit, based on the determined repetition number, a PRACH preamble of a random access procedure associated with the second RACH configuration.

17 Claims, 10 Drawing Sheets

(56) References Cited

OTHER PUBLICATIONS

3GPP TS 38.213 V17.5.0 (Mar. 2023); Technical Specification; 3rd Generation Partnership Project; Technical Specification Group Radio Access Network; NR; Physical layer procedures for control (Release 17).

3GPP TS 38.331 V17.4.0 (Mar. 2023); Technical Specification; 3rd Generation Partnership Project; Technical Specification Group Radio Access Network; NR; Radio Resource Control (RRC) protocol specification (Release 17).

Vivo, "RAN2 Impacts of Further NR Coverage Enhancements," 3GPP TSG-RAN WG2 Meeting #121bis-e, eMeeting, R2-2302598, Apr. 17-26, 2023.

Ericsson, "Discussion on Multiple PRACH transmissions," 3GPP TSG-RAN WG2 #121bis-e, Electronic meeting, Tdoc R2-2302888, Apr. 17-26, 2023.

Huawei et al., "Discussion on RAN2 impacts for PRACH coverage enhancement," 3GPP TSG-RAN WG2 Meeting #121bis-e, Online, R2-2303815, Apr. 17-26, 2023.

Qualcomm Incorporated, "UL Coverage Enhancements," 3GPP TSG-RAN WG2 Meeting #121 bis-e, Online, R2-2302926, Apr. 17-May 12, 2023.

Samsung, "RAN2 Impacts of Further NR Coverage Enhancements," 3GPP TSG RAN2 Meeting #121bis, Online, R2-2302600, Apr. 17-26, 2023.

Interdigital, "Multiple PRACH transmissions," 3GPP RAN WG2 Meeting #121-bis, Online, R2-2303605, Apr. 17-26, 2023.

ZTE Corporation et al., "RAN2 impacts on PRACH coverage enhancements," 3GPP TSG-RAN WG2 Meeting #121bis-e, Electronic meeting, R2-2303292, Apr. 17-26, 2023.

Nokia et al., "RAN2 impacts of PRACH CE," 3GPP TSG-RAN WG2 Meeting #121bis-e, Elbonia, R2-2303692, Apr. 17-26, 2023.

LG Electronics, "RAN2 aspects on support of multiple PRACH transmission," 3GPP TSG-RAN WG2 Meeting #121bis electronic, Online, R2-2304011, Apr. 17-26, 2023.

* cited by examiner

User Plane Protocol Stack

Control Plane Protocol Stack

METHOD AND APPARATUS FOR RANDOM ACCESS RESOURCE SELECTION IN MOBILE WIRELESS COMMUNICATION SYSTEM

CROSS-REFERENCE TO RELATED APPLICATION

This application claims priority to and the benefit of Korean Patent Application No. 10-2023-0058936, filed on May 8, 2023, the disclosure of which is incorporated herein by reference in its entirety.

BACKGROUND

Technical Field

To meet the increasing demand for wireless data traffic since the commercialization of 4th generation (4G) communication systems, the 5th generation (5G) system is being developed. For the sake of high data rate, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

In the 5G communication system, various feature combinations may be provided in one cell. The network may divide and provide RACH resources for each feature combination in order to achieve load balancing or the like. A means for efficiently providing RACH resource partitioning information for each combination of various features is required.

SUMMARY

Coverage enhancement may be achieved by configuring various communication resources and protocols as described herein. For example, PRACH preamble repetition (e.g., msg1 repetition) and PUSCH repetition (e.g., msg3 repetition) may be used for a four-step random access procedure. For PRACH preamble repetition, multiple PRACH preamble may be transmitted within one RACH attempt. For configuring PRACH preamble repetition (e.g., msg1 repetition), one or more additional RACH configurations may be used. In each of the one or more additional RACH configurations, one or more feature combination preamble parameters (e.g., FeatureCombinationPreambles, FeatureCombinationPreamblesList, FeatureCombination, etc.) may be configured.

The wireless device (e.g., the UE, the terminal, etc.) described herein may comprise a transceiver comprising at least one antenna, a memory storing instructions, and a controller configured to execute the instructions. The controller may be configured to execute the instructions to cause the wireless device to receive system information block 1 (SIB1) message of a cell. The SIB1 message may indicate a plurality of configuration parameters comprising a common uplink configuration of an uplink bandwidth part (BWP). The common uplink configuration of the uplink BWP may comprise: a common random access channel (RACH) configuration, a threshold for determining whether to select a resource associated with a physical random access channel (PRACH) preamble repetition number, and a second RACH configuration associated with feature combination. The second RACH configuration may indicate the PRACH preamble repetition number. The controller may be configured to execute the instructions to cause the wireless device to determine, based on the threshold and based on the PRACH preamble repetition number, a repetition number for PRACH preamble transmission, and repeatedly transmit, based on the determined repetition number, a PRACH preamble of a random access procedure associated with the second RACH configuration.

DETAILED DESCRIPTION

Hereinafter, embodiments of the present disclosure will be described in detail with reference to the accompanying drawings. In addition, in the description of the present disclosure, if it is determined that a detailed description of a related known function or configuration may unnecessarily obscure the gist of the present disclosure, the detailed description thereof will be omitted. In addition, the terms to be described later are terms defined in consideration of functions in the present disclosure, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

In this disclosure, means and apparatus to reduce the power consumption during XR service are provided.

Figure 1A:
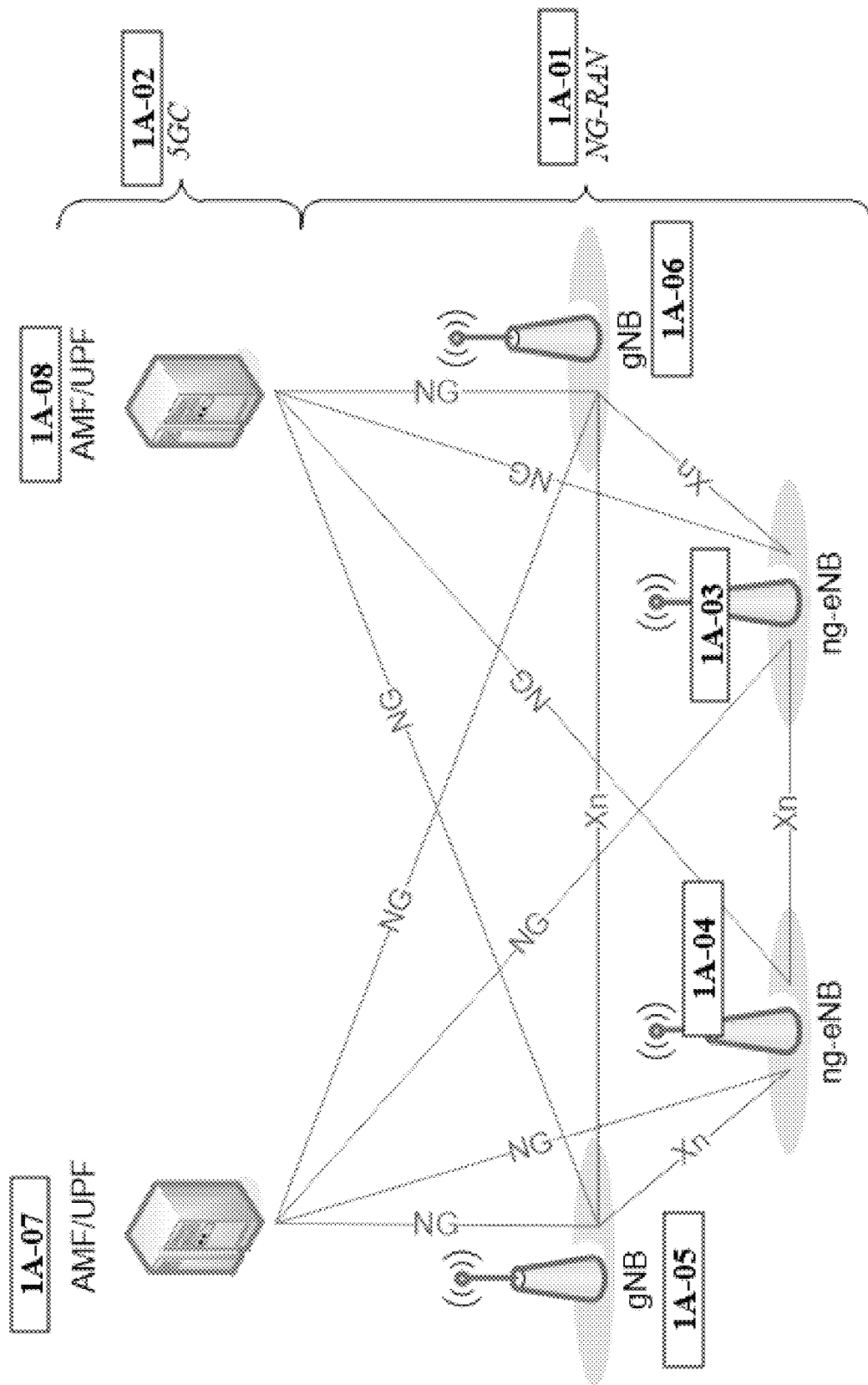
FIG. 1A is a diagram illustrating the architecture of a 5G system and a NG-RAN to which the disclosure may be applied.

FIG. 1A is a diagram illustrating the architecture of an 5G system and a NG-RAN to which the disclosure may be applied.

5G system consists of NG-RAN (1A-01) and 5GC (1A-02). An NG-RAN node is either gNB (providing NR user plane and control plane protocol terminations towards the terminal) or an ng-eNB (providing E-UTRA user plane and control plane protocol terminations towards the terminal).

The gNBs (1A-05 or 1A-06) and ng-eNBs (1A-03 or 1A-04) are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF (1A-07) and UPF (1A-08) may be realized as a physical node or as separate physical nodes.

A gNB (1A-05 or 1A-06) or an ng-eNBs (1A-03 or 1A-04) hosts the functions listed below.

Functions for Radio Resource Management such as Radio Bearer Control, Radio Admission Control, Connection Mobility Control, Dynamic allocation of resources to UEs in uplink, downlink and sidelink(scheduling); and

- IP and Ethernet header compression, uplink data decompression and encryption of user data stream; and
- Selection of an AMF at UE attachment when no routing to an MME can be determined from the information provided by the terminal; and
- Routing of User Plane data towards UPF; and
- Scheduling and transmission of paging messages; and
- Scheduling and transmission of broadcast information (originated from the AMF or O&M); and
- Measurement and measurement reporting configuration for mobility and scheduling; and
- Session Management; and
- QoS Flow management and mapping to data radio bearers; and
- Support of UEs in RRC_INACTIVE state; and
- Radio access network sharing; and
- Tight interworking between NR and E-UTRA; and
- Support of Network Slicing.

The AMF (1A-07) hosts the functions such as NAS signaling, NAS signaling security, AS security control, SMF selection, Authentication, Mobility management and positioning management.

The UPF (1A-08) hosts the functions such as packet routing and forwarding, transport level packet marking in the uplink, QoS handling and the downlink, mobility anchoring for mobility etc.

Figure 1B:
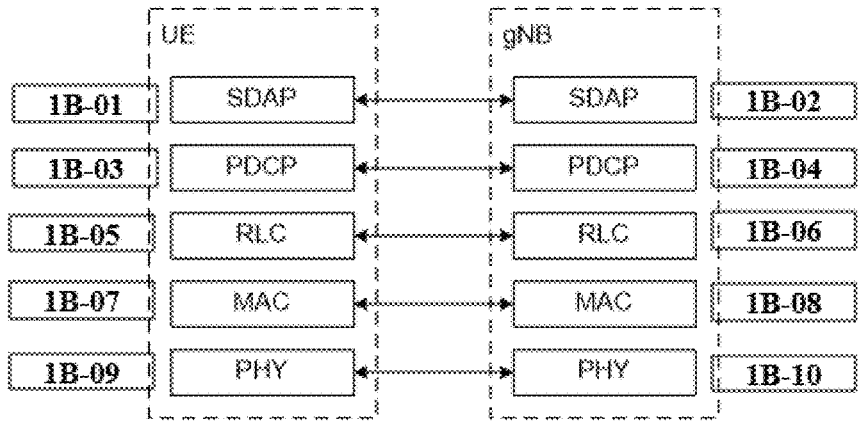
FIG. 1B is a diagram illustrating a wireless protocol architecture in a 5G system to which the disclosure may be applied.
Figure 1B:
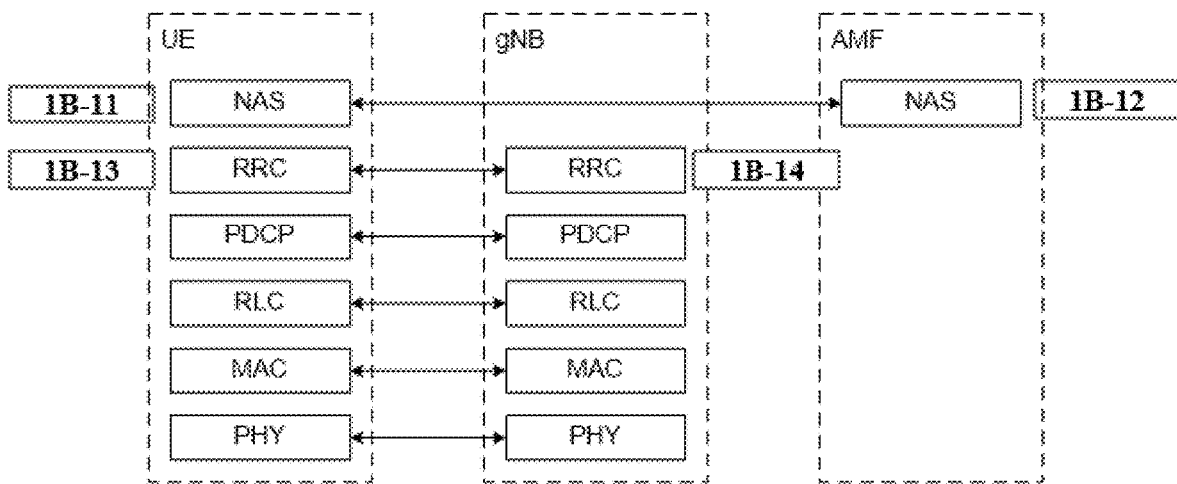

FIG. 1B is a diagram illustrating a wireless protocol architecture in an 5G system to which the disclosure may be applied.

User plane protocol stack consists of SDAP (1B-01 or 1B-02), PDCP (1B-03 or 1B-04), RLC (1B-05 or 1B-06), MAC (1B-07 or 1B-08) and PHY (1B-09 or 1B-10). Control plane protocol stack consists of NAS (1B-11 or 1B-12), RRC (1b-13 or 1b-14), PDCP, RLC, MAC and PHY.

Each protocol sublayer performs functions related to the operations listed below.

- NAS: authentication, mobility management, security control etc
- RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.
- SDAP: Mapping between a QoS flow and a data radio bearer, Marking QoS flow ID (QFI) in both DL and UL packets.
- PDCP: Transfer of data, Header compression and decompression, Ciphering and deciphering, Integrity protection and integrity verification, Duplication, Reordering and in-order delivery, Out-of-order delivery etc.
- RLC: Transfer of upper layer PDUs, Error Correction through ARQ, Segmentation and re-segmentation of RLC SDUs, Reassembly of SDU, RLC re-establishment etc.
- MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.
- PHY: Channel coding, Physical-layer hybrid-ARQ processing, Rate matching, Scrambling, Modulation, Layer mapping, Downlink Control Information, Uplink Control Information etc.

Figure 1C:
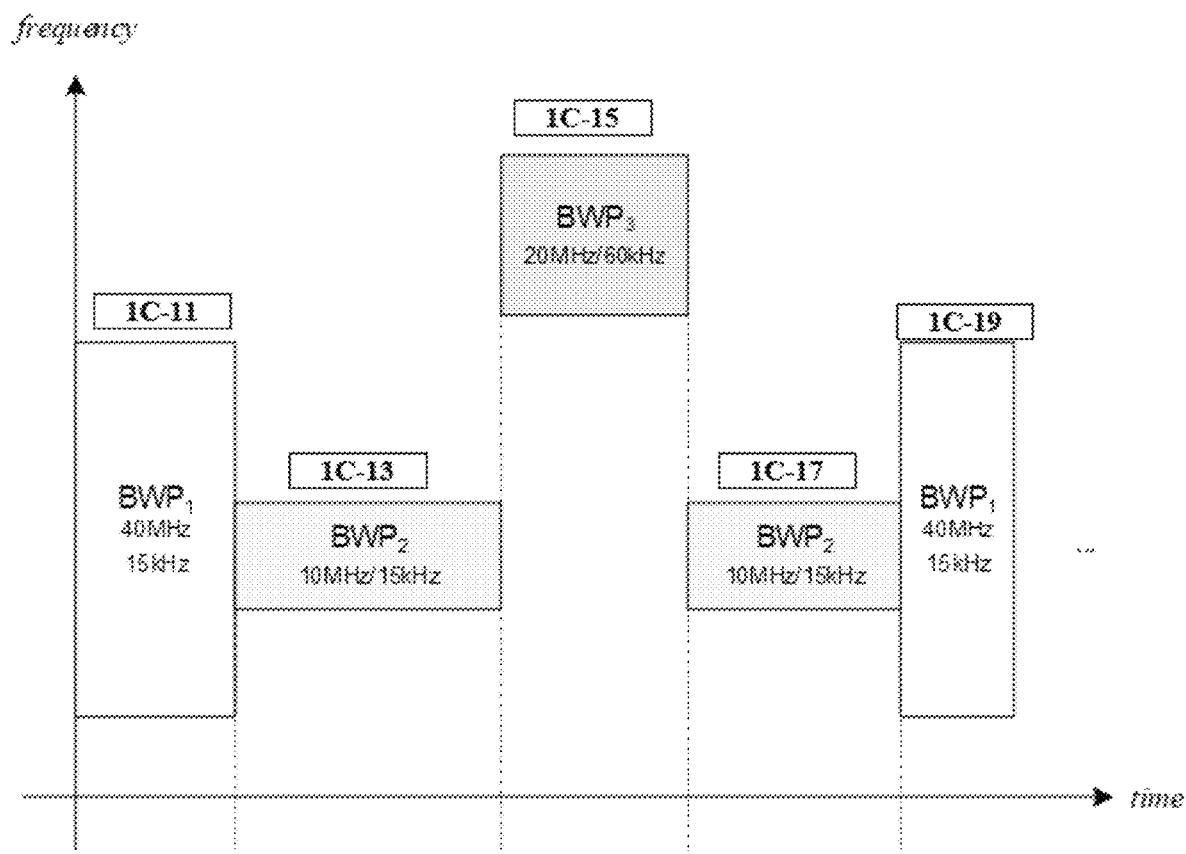
FIG. 1C is a diagram illustrating an example of a bandwidth part.

FIG. 1C is a diagram illustrating an example of a bandwidth part.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

FIG. 1C describes a scenario where 3 different BWPs are configured:

- BWP1 with a width of 40 MHz and subcarrier spacing of 15 kHz; 1C-11 or 1C-19
- BWP2 with a width of 10 MHz and subcarrier spacing of 15 kHz; 1C-13 or 1C-17
- BWP3 with a width of 20 MHz and subcarrier spacing of 60 kHz. 1C-15

When the RRC connection is established, additional BWPs may be configured for the UE.

Figure 1D:
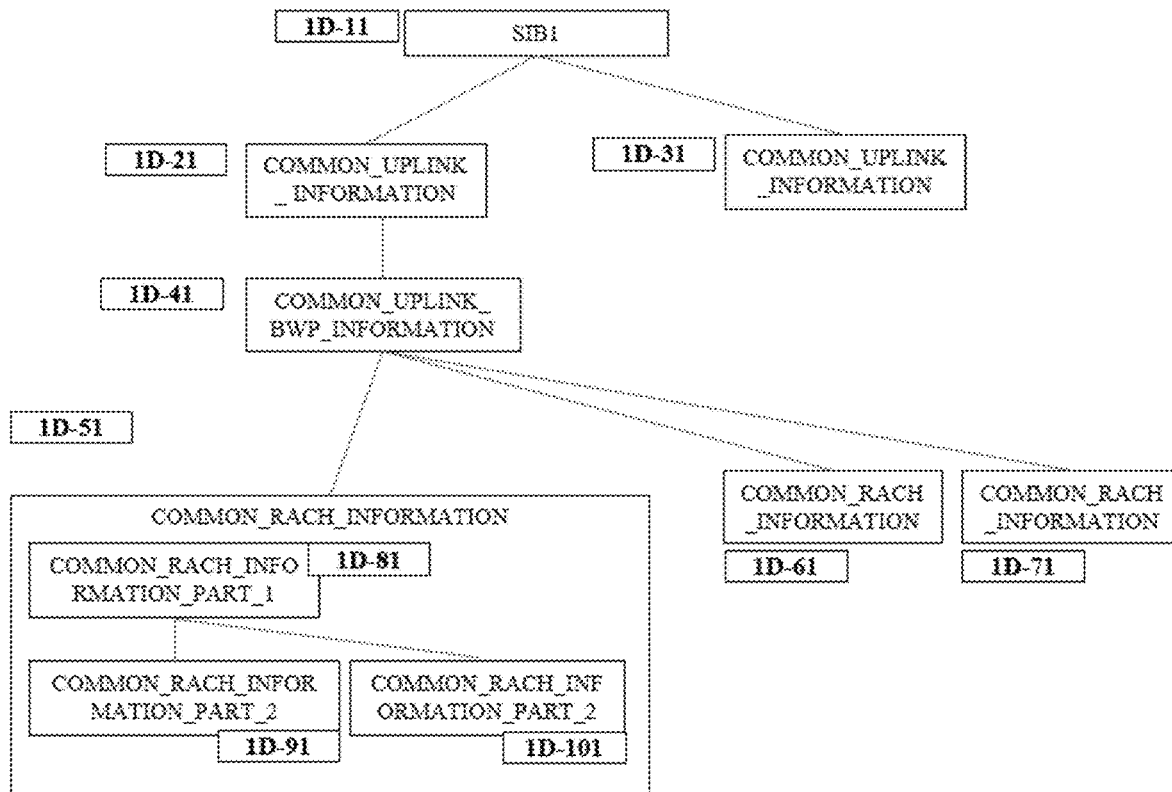
FIG. 1D is a diagram illustrating a structure of serving cell configuration information in system information.

FIG. 1D illustrates the relationship between a set of random access resources and COMMON_RACH_INFORMATION.

In this disclosure, XXX_XXX denotes an IE. xxx_xxx denotes a field. xxx_XXX denotes a variable. XXX_xxx denotes a value indicated in xxx_xxx field. X denotes an upper character. x denotes a lower character.

A SIB1 1D-11 may contain two COMMON_U-PLINK_INFORMATIONS 1D-21, 1D-31; one for a normal uplink and the other for supplementary uplink.

Each COMMON_UPLINK_INFORMATION comprises a COMMON_UPLINK_BWP_INFORMATION 1D-41.

The COMMON_UPLINK_BWP_INFORMATION comprises one or more COMMON_RACH_INFORMATION 1D-51, 1D-61, 1D-71.

Each COMMON_RACH_INFORMATION comprises a COMMON_RACH_INFORMATION_PART_1 1D-81 and zero or one or more COMMON_RACH_INFORMATION_PART_2s 1D-91, 1D-101.

A random access procedure is performed based on a set of random_access_resources and a set of random_access_parameters.

A set of random_access_resources and a set of random_access_parameters are indicated in a COMMON_RACH_INFORMATION_PART_1 and a COMMON_RACH_INFORMATION_PART_2, if the COMMON_RACH_INFORMATION comprises a COMMON_RACH_INFORMATION_PART_1 one or more and COMMON_RACH_INFORMATIONI_PART_2.

The COMMON_RACH_INFORMATION_PART_2 is one of one or more COMMON_RACH_INFORMATION_PART_2s of the COMMON_RACH_INFORMATION_PART_1.

A set of random_access_resources and a set of random_access_parameters are indicated in a COMMON_RACH_INFORMATION_PART_1, if the COMMON_RACH_INFORMATION comprises a COMMON_RACH_INFORMATION_PART_1 and does not comprise one or more COMMON_RACH_INFORMATIONI_PART_2.

A set of random_access_resources is resources for preamble transmission (PRACH transmission, msg1 transmission). A set of random_access_resources comprise a set of preamble_resources for PRACH transmission and a set of time_resources for PRACH transmission and a set of frequency_resource for PRACH transmission.

A set of preamble_resources for a random access procedure is indicated in a first COMMON_RACH_INFORMATION_PART_2 (start_preamble_for_this_partition field and number_of_preambles_per_ssb_for_this_partitioningfield).

The first COMMON_RACH_INFORMATION_PART_2 is a COMMON_RACH_INFORMATION_PART_2 selected, based on features that triggered the random access procedure and available features indicated in the COMMON_RACH_INFORMATION_PART_2, from one or more COMMON_RACH_INFORMATION_PART_2s in a first COMMON_RACH_INFORMATION.

The first COMMON_RACH_INFORMATION_PART_1 is a COMMON_RACH_INFORMATION_PART_1 in a first COMMON_RACH_INFORMATION.

The first COMMON_RACH_INFORMATION is a COMMON_RACH_INFORMATION selected based on features that triggered the random access procedure and available features indicated in one of the associated COMMON_RACH_INFORMATION_PART_2s, from one or more COMMON_RACH_INFORMATION in a first COMMON_UPLINK_BWP_INFORMATION.

The first COMMON_UPLINK_BWP_INFORMATION is the COMMON_UPLINK_BWP_INFORMATION of a first uplink BWP in a first uplink selected for random access procedure. The first COMMON_UPLINK_BWP_INFORMATION can be COMMON_UPLINK_BWP_INFORMATION of the initial uplink BWP.

The first uplink is the uplink selected for the random access procedure.

A set of time_resources for the random access procedure is indicated in the first COMMON_RACH_INFORMATION_PART_1 field in (prach_configuration GENERIC_RACH_INFORMATION IE) and in the first COMMON_RACH_INFORMATION_PART_2 (mask_index_for_ssb_shared_ro field in COMMON_ RACH_INFORMATION_PART_2 IE).

A set of firequency_resources for the random access procedure is indicated in the first COMMON_RACH_INFORMATION_PART_1 (fdm_for_prach field and frequency_start_for_prach field in GENERIC_RACH_INFORMATION IE)

A set of Random_Access_parameter comprise parameters_for_preambles and parameters_for_RAR and parameters_for_Msg3 and parameters_for_Msg4.

/1: parameters_for_preambles
//2: parameters_for_preambles in COMMON_RACH_INFORMATION_PART_1
///3: prach_configuration, fdm_for_prach, preamble_target_power, preamble_trans_max, power_ramping_step, total_number_of_ra_preambles, ssb_per_ro_and_ preambles_per_ssb, ra-msg3_size_group_a, message_ power_offset_group_b, number_of_preambles_group_a, msg1_subcarrier_spacing, rsrp_threshold_3,
//2: parameters_for_preambles in COMMON_RACH_INFORMATION_PART_2
///3: start_preamble_for_this_partition, number_of_preambles_per_ssb_for_this_partition, mask_index_for_ssb_shared_ro, ra-msg3_size_group_a, message_power_offset_group_b, number_of_preambles_group_a, rsrp_threshold_3, rsrp-threshold_2_rep1, rsrp-threshold_2_rep2
//2: parameters_for_preambles in COMMON_UPLINK_BWP_INFORMATION
///3: rsrp_threshold_2_list
/1: parameters_for_RAR
//2: msg2_window_length field in COMMON_RACH_INFORMATION_PART_1
/1: parameters_for_Msg3
//2: offset_preamble field in COMMON_RACH_INFORMATION_PART_2
//2: offset_preamble_msg field in COMMON_PUSCH_INFORMATION
//2: rsrp_thresdhold_4 field in COMMON_UPLINK_BWP_INFORMATION
/1: parameters_for_Msg4
//2: ra-contention_resolution_timer For parameters_for_preambles that are present in both COMMON_RACH_INFORMATION_PART_1 and COMMON_RACH_INFORMATION_PART_2 (ra-msg3_size_group_a, message_power_offset_group_b, number_of_preambles_group_a, rsrp_threshold_3), those in COMMON_RACH_INFORMATION_PART_2 is prioritized.

When a terminal selects a set of random_access_resources for a random access procedure, the terminal selects Random_Access_parameter as well.

Selecting a set of random_access_resources is equivalent to selecting a COMMON_RACH_INFORMATION_PART_2. By selecting a COMMON_RACH_INFORMATION_PART_2, a COMMON_RACH_INFORMATION_PART_1 associated with the selected COMMON_RACH_INFORMATION_PART_2 is also selected.

Figure 1E:
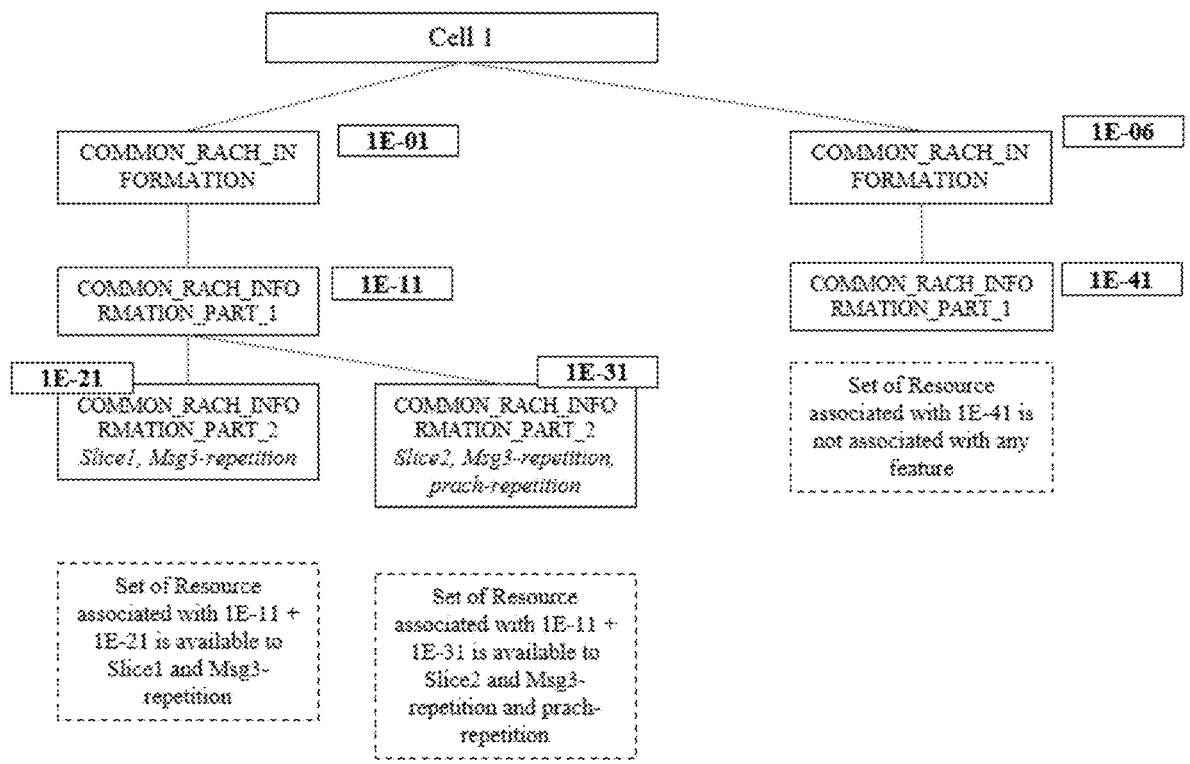
FIG. 1E is a diagram illustrating feature combinations supported in a cell.

FIG. 1E illustrates example of feature combinations and set of random access resources supported in a cell.

A cell 1 is configured with a two COMMON_RACH_INFORMATION 1E-01, 1E-06.

COMMON_RACH_INFORMATION 1E-01 comprises a COMMON_RACH_INFORMATION_PART_1 1E-11 and two COMMON_RACH_INFORMATION_PART_2 1E-21, 1E-31.

COMMON_RACH_INFORMATION 1E-06 comprises only a COMMON_RACH_INFORMATION_PART_1 1E-41.

The number of sets of random_access_resources in the cell1 is three.

A set of random_access_resources is associated with the COMMON_RACH_INFORMATION_PART_1 1E-11 and the COMMON_RACH_INFORMATION_PART_2 1E-21.

Another set of random_access_resources is associated with the COMMON_RACH_INFORMATION_PART_1 1E-11 and the COMMON_RACH_INFORMATION_PART_2 1E-31.

Yet another set of random_access_resources is associated with the COMMON_RACH_INFORMATION_PART_1 1E-41.

A set of random_access_resources associated with both a COMMON_RACH_INFORMATION_PART_1 and a COMMON_RACH_INFORMATION_PART_2 is available to the features indicated in the corresponding COMMON_RACH_INFORMATION_PART_2.

A set of random_access_resources associated with only a COMMON_RACH_INFORMATION_PART_1 is associated with no feature.

Figure 1F:
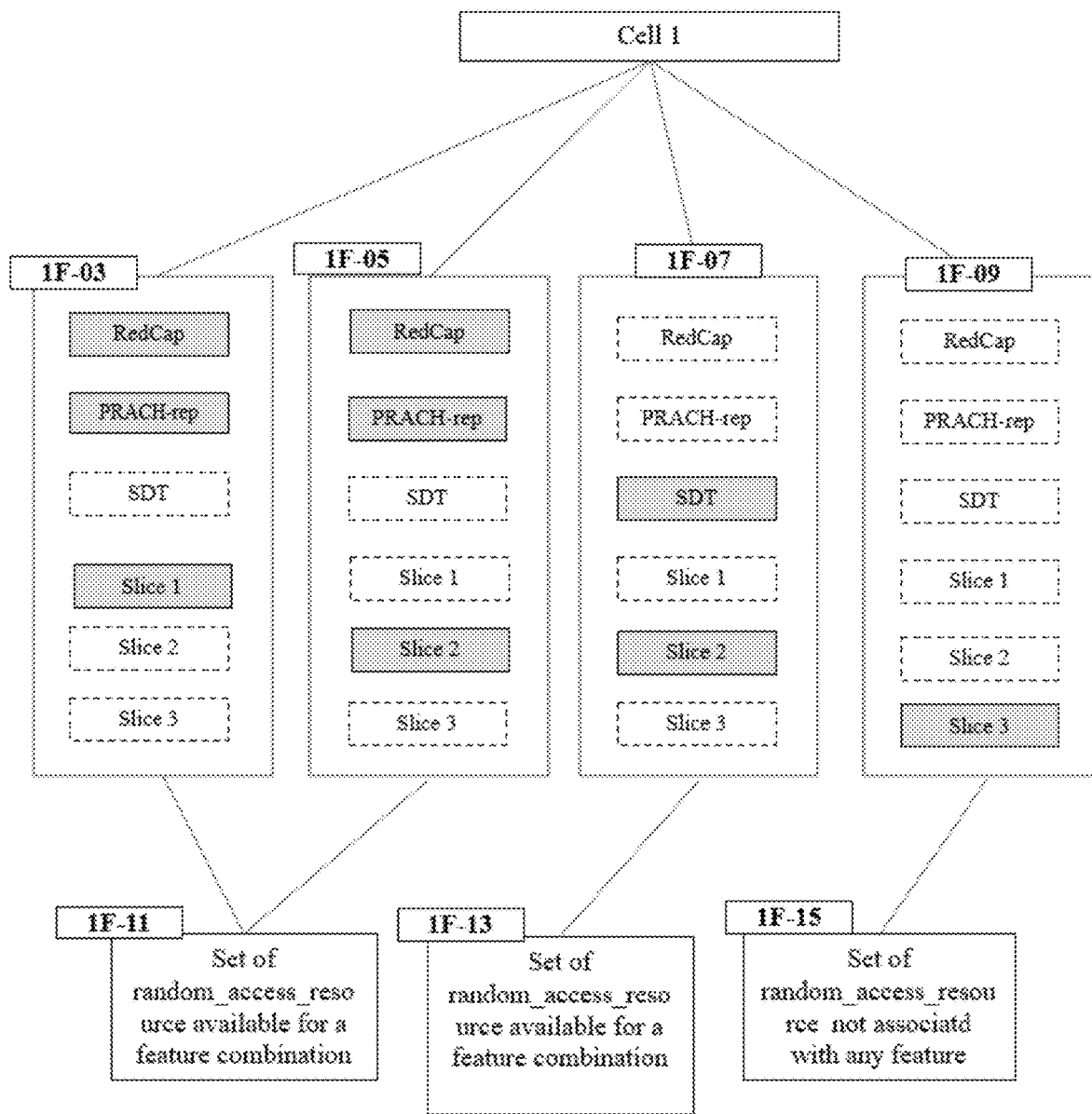
FIG. 1F is a diagram illustrating an example of mapping between feature combinations and sets of random access resources.

FIG. 1F illustrates example of mapping between feature combinations and sets of random access resources.

FIG. 1F illustrates example of mapping between feature combinations and sets of random access resources.

A single cell may support several features like RedCap, SDT, Coverage Enhancement and various slices.

Some of them can be used together by a UE. Network may want to partition RACH resources and related parameters per feature combination, to achieve load balancing and better performance. For example, if RACH resource is partitioned to RedCap, reduced capabilities can be indicated to the network in MSG1 so that the network can adapt subsequent transmissions. If RACH resource is partitioned to SDT, requesting larger MSG3 size is possible.

One problem is that the network may not provide all possible combinations due to lack of RACH resources. Another problem is that there could be considerable number of feature combinations supported in a single cell.

To address the problems, the disclosure provides methods and apparatus for providing UE to the relevant information on the RACH partitioning in an efficient way. Signaling load and processing load of the terminal are reduced by defining RACH-related parameters to be jointly applied to a plurality of feature combinations and parameters to be applied exclusively to one feature combination.

A network slice consists of a RAN part and a CN part. The support of network slicing relies on the principle that traffic for different slices is handled by different PDU sessions. Network can realize the different network slices by scheduling and also by providing different L1/L2 configurations.

Each network slice is uniquely identified by a S-NSSAI. NSSAI (Network Slice Selection Assistance Information) includes one or a list of S-NSSAIs (Single NSSAI) where a S-NSSAI is a combination of:
- mandatory SST (Slice/Service Type) field, which identifies the slice type and consists of 8 bits (with range is 0-255);
- optional SD (Slice Differentiator) field, which differentiates among Slices with same SST field and consist of 24 bits.

The list includes at most 8 S-NSSAI(s).

The UE provides NSSAI (Network Slice Selection Assistance Information) for network slice selection in RRCSetupComplete, if it has been provided by NAS. While the network can support large number of slices (hundreds), the UE need not support more than 8 slices simultaneously.

Network Slicing is a concept to allow differentiated treatment depending on each customer requirements.

Feature combination and RACH partition are explained with an example. Network support three sets of random_access_resources 1F-11 and 1F-13 and 1F-15.

Two sets of random_access_resources 1F-11 and 1F-13 are associated with a feature combinations respectively. A set of random_access_resources 1F-15 is not associated with any feature.

If a random access procedure is triggered for redcap feature and PRACH repetition feature and slice 1 1F-03, a set of resource most suitable for this feature combination 1F-11 is used for this random access procedure.

If a random access procedure is triggered for redcap feature and PRACH repetition feature and slice 2 1F-05, a set of resource most suitable for this feature combination 1F-11 is used for this random access procedure.

If a random access procedure is triggered for SDT feature and slice 2 1F-07, a set of resource most suitable for this feature combination 1F-13 is used for this random access procedure.

If a random access procedure is triggered for slice 3 and if slice 3 is not supported in any set of random_access_resources, a set of random_access_resources not associated with any feature 1F-15 is used for this random access procedure.

random access Preamble and preamble and PRACH and MSG1 are used interchangeably. UE and terminal are used interchangeably. GNB and base station are used interchangeably. A COMMON_RACH_INFORMATION_PART_2 and a set of random_access_resources and a Feature Combination are used interchangeably even though they are not exactly same thing. (They have one to one relationship with each other).

Figure 2A:
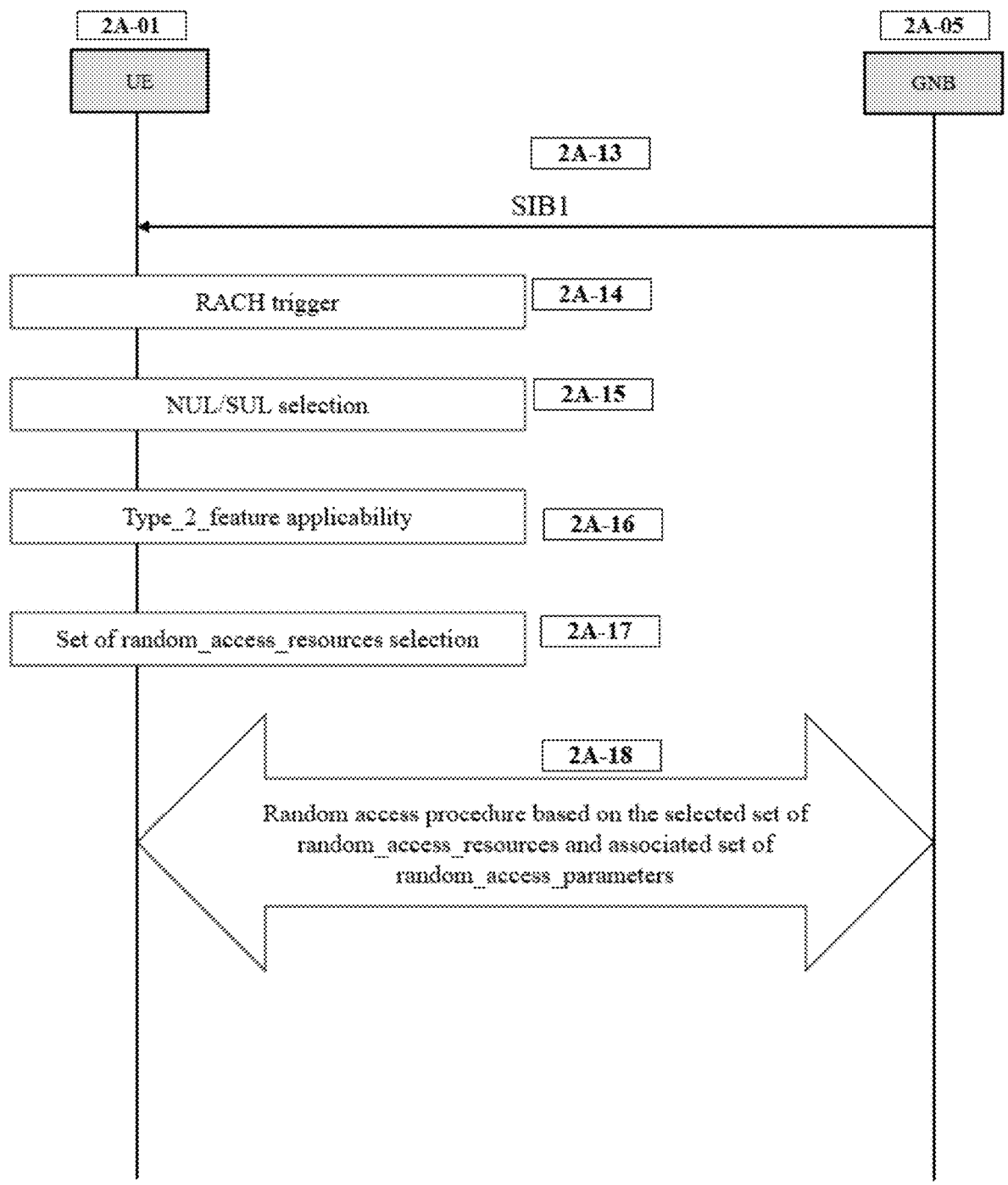
FIG. 2A is a diagram illustrating operations of a terminal and a base station according to an embodiment of the present disclosure.

FIG. 2A illustrates the operations of UE in RRC_IDEL or in RRC_INACTIVE and GNB for random access procedure for PRACH coverage enhancements.

When UE is switched on, UE performs cell selection and camps on a suitable cell.

In 2A-13, UE receives SIB1 in the suitable cell. GNB includes various information in the SIB1. SIB1 contains information relevant when evaluating if a UE is allowed to access a cell and defines the scheduling of other system information. It also contains radio resource configuration information that is common for all UEs. It also contains radio resource configuration information that is common for feature combinations.

SIB1 comprises following fields.
SIB1::=SEQUENCE {
. . .
scheduling_information_for_si SCHEDULING_INFORMATION_FOR_SI OPTIONAL,
common_serving_cell_configuration COMMON_SERVING_CELL_CONFIGURATION_SIB OPTIONAL,
priority_of_features SEQUENCE {
priority_of_redcap PRIORITY_OF_FEATURE OPTIONAL,
priority_of_slices PRIORITY_OF_FEATURE OPTIONAL,
priority_of_msg3_repetition PRIORITY_OF_FEATURE OPTIONAL,
sdt-Priority PRIORITY_OF_FEATURE OPTIONAL
} OPTIONAL,
priority_of_features_extension SEQUENCE { priority_of_prach_reptitions_list SEQUENCE (SIZE (1 . . . 3)) OF PRIORITY_OF_FEATURE OPTIONAL,
} OPTIONAL,
} priority_of_features field indicates priorities for first set of features. The first set of features comprises RedCap, Slicing, SDT and MSG3-repetitions.

priority_of_features_extension field indicates priorities for second set of features. The second set of features comprises PRACH repetitions. To ensure backward compatibility, the priority of PRACH repetition is indicated in a different field.

priority_of_features field and priority_of_features_extension field comprises one or more PRIORITY_OF_FEATURE IES.

These priorities are used to determine which COMMON_RACH_INFORMATION_PART_2 the UE shall use when a feature (or feature combinations) maps to more than one COMMON_RACH_INFORMATION_PART_2.

A PRIORITY_OF_FEATURE IE indicates an integer between 0 and 7. A lower value in the PRIORITY_OF_FEATURE IE means a higher priority. The network does not signal the same priority for more than one feature. The network signals a priority for all feature that map to at least one COMMON_RACH_INFORMATION_PART_2.

priority_of_prach_reptitions_list field comprises one or two or three PRIORITY_OF_FEATURE IEs. The first PRIORITY_OF_FEATURE IE of the list corresponds to the PRACH repetitions with lowest number of repetitions. The second PRIORITY_OF_FEATURE IE of the list corresponds to the PRACH repetitions with next lowest (or second highest or highest) number of repetitions. The third PRIORITY_OF_FEATURE IE of the list corresponds to the PRACH repetitions with the highest number of repetitions.

COMMON_SERVING_CELL_CONFIGURATION_SIB IE is used to configure cell specific parameters of a UE's serving cell in SIB1.

COMMON_SERVING_CELL_CONFIGURATION_SIB::=SEQUENCE {common_downlink_information COMMON_DOWNLINK_INFORMATION_ SIB,
common_uplink_information COMMON_UPLINK_INFORMATION_SIB OPTIONAL,
common_supplementary_uplink_configuration COMMON_UPLINK_INFORMATION_SIB OPTIONAL,
. . .
}

The COMMON_DOWNLINK_INFORMATION_SIB provides common downlink parameters of a cell.
COMMON_DOWNLINK_INFORMATION_SIB::=SEQUENCE {
frequency_info_dl FREQUENCY_INFO_DL_SIB,
initial_downlink_bwp COMMON_DL_BWP_CONFIGURATION,
bcch_configuration BCCH_CONFIGURATION,
pcch_configuration PCCH_CONFIGURATION,
. . .
}

The COMMON_UPLINK_INFORMATION_SIB provides common uplink parameters of a cell.
COMMON_UPLINK_INFORMATION_SIB::=SEQUENCE {
frequency_info_ul FREQUENCY_INFO_UL_SIB,
initial_uplink_bwp COMMON_UPLINK_BWP_INFORMATION,
time AlignmentTimerCommon TimeAlignmentTimer
}

The COMMON_UPLINK_BWP_INFORMATION is used to configure the common parameters of an uplink BWP.

The COMMON_UPLINK_BWP_INFORMATION IE comprises one or more COMMON_RACH_INFORMATION IEs. The first COMMON_RACH_INFORMATION IE is included in the common_rach_information field. Additional COMMON_RACH_INFORMATION IEs are included in the additional_rach_configuration_list field.

COMMON_UPLINK_BWP_INFORMATION::=SEQUENCE {
generic_parameters BWP,
common_rach_information SetupRelease {COMMON_RACH_INFORMATION} OPTIONAL,
common_pusch_information SetupRelease {COMMON_PUSCH_INFORMATION} OPTIONAL,
common_pucch_information SetupRelease {COMMON_PUCCH_INFORMATION} OPTIONAL,
additional_rach_configuration_list SetupRelease {ADDITIONAL_RACH_CONFIGURATION_LIST} OPTIONAL,
rsrp_thresdhold_4 RSRP-Range OPTIONAL,
number_of_msg3_repetitions_list SEQUENCE (SIZE (4)) OF NUMBER_OF_MSG3_REPETITIONS OPTIONAL,
mcs_msg3_repetitions SEQUENCE (SIZE (8)) OF INTEGER (0 . . . 31) OPTIONAL
rsrp_thresdhold_2_list SEQUENCE (SIZE (3)) OF rsrp_threshold_2 OPTIONAL, . . .
. . .
}

ADDITIONAL_RACH_CONFIGURATION_LIST field comprises list of feature or feature combination-specific RACH configurations, i.e. the RACH configurations configured in addition to the one configured by COMMON_RACH_INFORMATION in common_rach_information field.

ADDITIONAL_RACH_CONFIGURATION_LIST IE comprises one or more ADDITIONAL_RACH_CONFIGURATION IEs.

ADDITIONAL_RACH_CONFIGURATION::=SEQUENCE {
common_rach_information COMMON_RACH_INFORMATION OPTIONAL,
common_msga_configuration COMMON_MSGA_CONFIGURATION OPTIONAL,
. . .
} mcs_msg3_repetitions field indicates configuration of eight candidate MCS indexes for PUSCH transmission scheduled by RAR UL grant and DCI format 0_0 with CRC scrambled by TC-RNTI. Only the first 4 configured or default MCS indexes are used for PUSCH transmission scheduled by RAR UL grant. This field is only applicable when the UE selects a set of random_access_resources indicating Msg3 repetition in this BWP. If this field is absent when the set(s) of random_access_resources with MSG3 repetition indication are configured in the COMMON_UPLINK_BWP_INFORMATION, the UE shall apply the values {0, 1, 2, 3, 4, 5, 6, 7}.

number_of_msg3_repetitions_list field indicates the number of repetitions for PUSCH transmission scheduled by RAR UL grant and DCI format 0_0 with CRC scrambled by TC-RNTI. This field is only applicable when the UE selects random_access_resources indicating Msg3 repetition in this BWP. If this field is absent when the set(s) of random_access_resources with MSG3 repetition indication are configured in the COMMON_UPLINK_BWP_INFORMATION, the UE shall apply the values {n1, n2, n3, n4}.

common_pucch_information field indicates cell specific parameters for the PUCCH of this BWP.

common_pusch_information field indicates cell specific parameters for the PUSCH of this BWP. COMMON_PUSCH_INFORMATION IE comprises an offset_preamble_msg3 field. The offset_preamble_msg3 field indicates power offset between msg3 and RACH preamble transmission.

common_rach_information field indicates configuration of cell specific random access parameters which the UE uses for contention based and contention free random access as well as for contention based beam failure recovery in this BWP.

rsrp_thresdhold_4 field indicates threshold used by the UE for determining whether to select resources indicating Msg3 repetition in the first BWP. The field is mandatory if both set(s) of random_access_resources with MSG3 repetition indication and set(s) of random_access_resources without MSG3 repetition indication are configured in the BWP. It is absent otherwise.

rsrp_thresdhold_2_list field indicates one or more thresholds used by the UE for determining whether to select resources indicating PRACH repetition in the first BWP. The field is mandatory if both set(s) of random_access_resources with PRACH repetition indication and set(s) of random_access_resources without PRACH repetition indication are configured in the BWP. It is absent otherwise.

rsrp_thresdhold_2_list field comprises one or more rsrp_threshold_2 fields. A rsrp_threshold_2 field comprise a RSRP-range IE which indicating a specific RSRP-value.

/1: If only one rsrp_threshold_2 field is present in the list,
//2: Prach_Repetition_selection_condition for the first PRACH repetition is fulfilled if the RSRP of the downlink pathloss reference is less than the RSRP_threshold_2.

/1: If two rsrp_threshold_2 fields are present in the list,
//2: Prach_Repetition_selection_condition for the first PRACH repetition is fulfilled if the RSRP of the downlink pathloss reference is less than the first RSRP_threshold_2 and higher than the second RSRP_threshold_2.
//2: Prach_Repetition_selection_condition for the second PRACH repetition is fulfilled if the RSRP of the downlink pathloss reference is less than the second RSRP_threshold_2.

/1: If three rsrp_threshold_2 fields are present in the list,
//2: Prach_Repetition_selection_condition for the first PRACH repetition is fulfilled if the RSRP of the downlink pathloss reference is less than the first RSRP_threshold_2 and higher than the second RSRP_threshold_2.
//2: Prach_Repetition_selection_condition for the second PRACH repetition is fulfilled if the RSRP of the downlink pathloss reference is less than the second RSRP_threshold_2 and higher than the third RSRP_threshold_2.
//2: Prach_Repetition_selection_condition for the third PRACH repetition is fulfilled if the RSRP of the downlink pathloss reference is less than the third RSRP_threshold_2.

/1: If Prach_Repetition_selection_condition for the first PRACH repetition is fulfilled, UE considers the first PRACH repetition is applicable. The first PRACH repetition is PRACH repetition with the lowest number of repetitions (e.g., 2 or the lowest number of repetitions configured in the first BWP).

/1: If Msg_2_repetition_selection_condition for the second PRACH repetition is fulfilled, UE considers the second PRACH repetition is applicable. The second PRACH repetition is PRACH repetition with the second lowest number of repetitions.

/1: If Msg_2_repetition_selection_condition for the third PRACH repetition is fulfilled, UE considers the thrid PRACH repetition is applicable. The third PRACH repetition is PRACH repetition with the highest number of repetitions.

The COMMON_RACH_INFORMATION is used to specify the cell specific random-access parameters.

COMMON_RACH_INFORMATION::=SEQUENCE {
GENERIC_RACH_INFORMATION GENERIC_RACH_INFORMATION,
total_number_of_ra_preambles INTEGER (1 . . . 63) OPTIONAL,
ssb_per_ro_and_preambles_per_ssb CHOICE {
oneEighth ENUMERATED {n4, n8, n12, n16, n20, . . . , n64},
oneFourth ENUMERATED {n4, n8, n12, n16, n20, . . . , n64},
oneHalf ENUMERATED {n4, n8, n12, n16, n20, . . . , n64},
one ENUMERATED {n4, n8, n12, n16, n20, . . . , n64},
two ENUMERATED {n4, n8, n12, n16, n20, n24, n28, n32},
four INTEGER (1 . . . 16),
eight INTEGER (1 . . . 8),
sixteen INTEGER (1 . . . 4)
} OPTIONAL,
group_b_configured SEQUENCE {
ra_msg3_size_group_a ENUMERATED {b56, b144, b208, . . . },
message_power_offset_group_b ENUMERATED {minusinfinity, dB0, dB5, . . . ,
number_of_preambles_group_a INTEGER (1 . . . 64)
} OPTIONAL,
ra-contention_resolution_timer ENUMERATED {sf8, sf16, sf24, sf32, sf40, sf48, sf56, sf64},
rsrp_threshold_3 RSRP-Range OPTIONAL,
rsrp_thresdhold_1 RSRP-Range OPTIONAL,
msg1_subcarrier_spacing SUBCARRIER_SPACING OPTIONAL,
common_rach_information_part_2_list SEQUENCE (SIZE(1 . . . 16)) OF COMMON_RACH_INFORMATION_PART_2 OPTIONAL
. . .
} common_rach_information_part_2_list field specifies a series of preamble partitions each associated to a combination of features and 4-step RA. The network does not configure this list to have more than 16 entries.

message_power_offset_group_b field indicates threshold for preamble selection. Value is in dB. Value minusinfinity corresponds to −infinity. Value dB0 corresponds to 0 dB, dB5 corresponds to 5 dB and so on.

msg1_subcarrier_spacing field indicates subcarrier spacing of PRACH. If absent, the UE applies the SCS as derived from the prach_configuration in GENERIC_RACH_INFORMATION.

number_of_preambles_group_a field indicates the number of CB preambles per SSB in group A. This determines implicitly the number of CB preambles per SSB available in group B.

ra-contention_resolution_timer field indicates the initial value for the contention resolution. Value sf8 corresponds to 8 subframes, value sf16 corresponds to 16 subframes, and so on.

ra_msg3_size_group_a field indicates Transport Blocks size threshold in bits below which the UE shall use a contention-based RA preamble of group A.

rsrp_threshold_3 field indicates threshold for SSB selection. UE may select the SS block and corresponding PRACH resource for path-loss estimation and (re)transmission based on SS blocks that satisfy the threshold.

rsrp_thresdhold_1 field indicates threshold for carrier selection. The UE selects SUL carrier to perform random access based on this threshold. The value applies to all the BWPs and all RACH configurations.

ssb_per_ro_and_preambles_per_ssb field indicates the mapping between SSB and RACH occasion. The meaning of this field is twofold: the CHOICE conveys the information about the number of SSBs per RACH occasion. Value oneEighth corresponds to one SSB associated with 8 RACH occasions, value oneFourth corresponds to one SSB associated with 4 RACH occasions, and so on. The ENUMERATED part indicates the number of Contention Based preambles per SSB. Value n4 corresponds to 4 Contention Based preambles per SSB, value n8 corresponds to 8 Contention Based preambles per SSB, and so on. The total number of CB preambles in a RACH occasion is given by CB-preambles-per-SSB*max(1, SSB-per-rach-occasion).

total_number_of_ra_preambles field indicates total number of preambles used for contention based and contention free 4-step or 2-step random access in the RACH resources defined in COMMON_RACH_INFORMATION, excluding preambles used for other purposes (e.g. for SI request). If the field is absent, all 64 preambles are available for RA.

A COMMON_RACH_INFORMATION IE not comprising COMMON_RACH_INFORMATION_PART_2 is a default COMMON_RACH_INFORMATION.

GENERIC_RACH_INFORMATION IE is used to specify the random-access parameters.

GENERIC_RACH_INFORMATION::=SEQUENCE {
  prach_configuration INTEGER (0 . . . 255),
  fdm_for_prach ENUMERATED {one, two, four, eight},
  frequency_start_for_prach INTEGER (0 . . . maxNrofPhysicalResourceBlocks-1),
  preamble_target_power INTEGER (−202 . . . 60),
  preamble_max ENUMERATED {n3, n4, n5, n6, n7, . . . },
  power_ramping_step ENUMERATED {dB0, dB2, dB4, dB6},
  msg2_window_length ENUMERATED {sl1, sl2, sl4, sl8, sl10, sl20, sl40, sl80},
  . . .
} fdm_for_prach field indicates the number of PRACH transmission occasions FDMed in one time instance.

frequency_start_for_prach field indicates offset of lowest PRACH transmission occasion in frequency domain with respective to PRB 0.

power_ramping_step field indicates power ramping steps for PRACH.

prach_configuration field indicates index of PRACH configuration. A PRACH_configuration is multifold value indicating followings simultaneously; preamble format, SFNs and subframe numbers for PRACH slots, starting symbols, PRACH duration.

preamble_target_power field indicates the target power level at the network receiver side. Only multiples of 2 dBm may be chosen (e.g. −202, −200, −198, . . . ). preamble_max field indicates Max number of RA preamble transmission performed before declaring a failure (see TS 38.321 [3], clauses 5.1.4, 5.1.5).

msg2_window_length field indicates Msg2 (RAR) window length in number of slots. The network configures a value lower than or equal to 10 ms when Msg2 is transmitted in licensed spectrum.

The COMMON_RACH_INFORMATION_PART_2 associates a set of preambles (and other parameters) with a feature combination.

COMMON_RACH_INFORMATION_PART_2::=SEQUENCE {
  combination_of_features COMBINATION_OF_FEATURES,
  start_preamble_for_this_partition INTEGER (0 . . . 63),
  number_of_preambles_per_ssb_for_this_partition INTEGER (1 . . . 64),
  mask_index_for_ssb_shared_ro INTEGER (1 . . . 15) OPTIONAL,
  group_b_configured SEQUENCE {
    ra_msg3_size_group_a ENUMERATED {b56, b144, b208, . . . },
    message_power_offset_group_b ENUMERATED {minusinfinity, dB0, . . . },
    number_of_preambles_group_a INTEGER (1 . . . 64)
  } OPTIONAL,
  rsrp_threshold_3 RSRP-Range OPTIONAL,
  offset_preamble INTEGER (−1 . . . 6) OPTIONAL,
  number_of_prach_repetitions ENUMERATED {2, 4, 8}, OPTIONAL
  rsrp-threshold_2_rep1 RSRP-range OPTIONAL,
  rsrp-threshold_2_rep2 RSRP-range OPTIONAL
} offset_preamble field indicates Power offset between msg3 and RACH preamble transmission. If configured, this parameter overrides offset_preamble_msg3 in COMMON_PUSCH_INFORMATION IE, Actual value=field value * 2 [dB].

combination_of_features field indicates which combination of features that the preambles indicated by this IE are associated with. The UE ignores a RACH resource defined by this COMMON_RACH_INFORMATION_PART_2 if any feature within the combination_of_features field is not supported by the UE or if any of the spare fields within the combination_of_features is set to true.

message_power_offset_group_b field indicates threshold for preamble selection. Value is in dB. Value minusinfinity corresponds to −infinity. Value dB0 corresponds to 0 dB, dB5 corresponds to 5 dB and so on.

number_of_preambles_per_ssb_for_this_partitioning field indicates the mapping between preamble resource and SSB. It determines how many consecutive preambles are associated to the Feature Combination starting from the starting preamble(s) per SSB.

number_of_preambles_group_a field indicates how many consecutive preambles per SSB are associated to Group A starting from the starting preamble(s). The remaining preambles associated to the Feature Combination are associated to Group B ra-size_group_a field indicates Transport Blocks size threshold in bits below which the UE shall use a contention-based RA preamble of group A.

rsrp_threshold_3 field indicates L1-RSRP threshold used for determining whether a candidate beam may be used by the UE.

mask_index_for_ssb_shared_ro field indicates Mask index. It indicates a subset of ROs where preambles are allocated for this feature combination.

start_preamble_for_this_partition field indicates the first preamble associated with the feature combination (COMMON_RACH_INFORMATION_2). If the UE is provided with a number N of SSB block indexes associated with one PRACH occasion, and N<1, the first preamble in each PRACH occasion is the one having the same index as indicated by this field. If N>=1, N blocks of preambles associated with the Feature Combination are defined, each having start index+start_preamble_for_this_partition, where n refers to SSB block index number_of_prach_repetitions field indicates the number of PRACH repetitions. For random_access_resources associated with the Feature Combination, the UE applies indicated repetitions for PRACH transmission.

number_of_prach_repetitions field indicates the number of PRACH repetitions. For random_access_resources associated with the Feature Combination, the UE applies indicated repetitions for PRACH transmission.

rsrp-threshold_2_rep1 field indicates the upper bound of the RSRP.

rsrp-threshold_2_rep2 field indicates the lower bound of the RSRP.

UE consider the COMMON_RACH_INFORMATION_PART_2 is applicable if the RSRP is lower than rsrp-threshold_2_rep1 and higher than rsrp-threshold_2_rep2.

If rsrp-threshold_2_rep1 is absent, UE consider the COMMON_RACH_INFORMATION_PART_2 is applicable if the RSRP is higher than rsrp-threshold_2_rep2. For the lowest number of repetitions (i.e., number_of_prach_repetitions is 2), this field is absent.

If rsrp-threshold_2_rep2 is absent, UE consider the COMMON_RACH_INFORMATION_PART_2 is applicable if the RSRP is lower than rsrp-threshold_2_rep2. For the highest number of repetitions (i.e., number_of_prach_repetitions is 8), this field is absent.

The COMBINATION_OF_FEATURES indicates a feature or a combination of features to be associated with a set of random_access_resources (i.e. an instance of COMMON_ RACH_INFORMATION_PART_2).

COMBINATION_OF_FEATURES::=SEQUENCE {
redCap ENUMERATED {true} OPTIONAL,
smallData ENUMERATED {true} OPTIONAL,
nsag NSAG-List OPTIONAL,
msg3_repetitions ENUMERATED {true} OPTIONAL,
prach_repetitions ENUMERATED {true} OPTIONAL,
spare3 ENUMERATED {true} OPTIONAL,
spare2 ENUMERATED {true} OPTIONAL,
spare1 ENUMERATED {true} OPTIONAL
} redcap field, if present, indicates that RedCap is part of this feature combination.

smallData field, if present, indicates that Small Data is part of this feature combination.

nsag field, if present, indicates NSAG(s) that are part of this feature combination. A NSAG corresponds to a group of slices. nsag-field collectively indicates whether a group of slices are part of this feature combination.

msg3_repetitions field, if present, indicates that (signalling of) msg3 repetition is part of this feature combination. This field is not configured in a set of preambles that is configured with 2-step random-access type.

Prach_repetitions field, if present, indicates that (signalling of) PRACH repetition (PRACH repetition, preamble repetition) is part of this feature combination. This field is not configured in a set of preambles that is configured with 2-step random-access type. This field collectively indicates one or more PRACH repetition features are part of this feature combination.

In 2A-14, UE triggers a random access procedure. The random access procedure is triggered by a type_1_feature or for SI request transmission or for RRC message transmission or for MAC CE transmission.

Type_1_feature is a feature related to a slice. When a data occurs and the data is for a slice and a random access is triggered due to the data, the random access is triggered by the Type_1_feature.

Type_2_feature is a feature that may or may not be applicable to a random access procedure depending on the channel condition at the time point when the random access procedure is triggered. msg3-repetition and msg1-repetition are Type_2_features. Type_2_features themselves do not trigger a random access procedure. Type_2_features can be considered in selecting a set of random_access_resources for a random access procedure if the random access procedure is triggered by a Type_1_features or other causes. Depending on the configurations and channel conditions, one or more Type_2_features can be considered applicable to the already triggered random access procedure.

If the random access procedure is triggered by a Type_1_feature, The Type_1_feature is applicable to the random access procedure.

If a Type_2_feature is determined to be applicable to a random access procedure, the Type_2_feature is considered to be one of features that trigger the random access procedure.

In 2A-15, UE selects, based at least in part on a first rsrp_thresdhold_1, an uplink where random access procedure is to be performed.

If the RSRP of the downlink pathloss reference is less than the first rsrp_thresdhold_1, UE select the NUL carrier for performing random access procedure.

If the RSRP of the downlink pathloss reference is greater than or equal to the first rsrp_thresdhold_1, UE select the SUL carrier for performing random access procedure.

The first rsrp_thresdhold_1 is the rsrp_thresdhold_1 appears first in the COMMON_SERVING_CELL_CONFIGURATION_SIB.

In 2A-16, UE determines whether Msg3 repetition and PRACH repetition is applicable for the current random access procedure. UE determines whether Type_2_features are applicable to the random access procedure.

For Msg3 repetition,
/1: If the first BWP is configured with both set(s) of random_access_resources with msg3_repetitions set to true and set(s) of random_access_resources without msg3_repetitions set to true and the RSRP of the downlink pathloss reference is less than rsrp_thresdhold_4 of the selected uplink,
//2: the UE determines Msg3 repetition is applicable for the current random access procedure.
/1: If the first BWP is only configured with the set(s) of random_access_resources with msg3_repetitions set to true,
//2: the UE determines Msg3 repetition is applicable for the current random access procedure.
/1: If the first BWP is configured with both set(s) of random_access_resources with msg3_repetitions set to true and set(s) of random_access_resources without msg3_repetitions set to true and the RSRP of the downlink pathloss reference is higher than rsrp_thresdhold_4 of the selected uplink, //2: the UE determines Msg3 repetition is not applicable for the current random access procedure.
/1: If the first BWP is only configured with the set(s) of random_access_resources without msg3_repetitions set to true,
//2: the UE determines Msg3 repetition is not applicable for the current random access procedure.

For Msg1 repetition,
/1: If the first BWP is configured with both set(s) of random_access_resources with prach_repetitions set to true and set(s) of random_access_resources without prach_repetitions set to true, and
/1: if the RSRP of the downlink pathloss reference is lower than a first rsrp_threshold_2 of the selected uplink,
//2: the UE determines one of the first PRACH repetition and the second PRACH repetition and the third PRACH repetition are applicable for the current random access procedure.
/1: If the first BWP is only configured with the set(s) of random_access_resources with prach_repetitions set to true,
//2: the UE determines one of the first PRACH repetition and the second PRACH repetition and the third PRACH repetition are applicable for the current random access procedure.
/1: If the first BWP is configured with both set(s) of random_access_resources with prach_repetitions set to true and set(s) of random_access_resources without prach_repetitions set to true, and
/1: if the RSRP of the downlink pathloss reference is higher than a first rsrp_threshold_2 of the selected uplink,
//2: the UE determines neither the first PRACH repetition nor the second PRACH repetition nor the third PRACH repetition is applicable for the current random access procedure.
/1: If the first BWP is only configured with the set(s) of random_access_resources without prach_repetitions set to true,
//2: the UE determines neither the first PRACH repetition nor the second PRACH repetition nor the third PRACH repetition is applicable for the current random access procedure.

The first BWP is the BWP selected for random access procedure in the selected uplink. It can be an initial uplink BWP.

The first rsrp_threshold_2 is the highest rsrp_threshold_2 of the one or more rsrp_threshold_2s included in the COMMON_UPLINK_INFORMATION of the selected uplink. The first rsrp_threshold_2 is the rsrp_threshold_2 appears first (or located first or placed first) in the list of one or more rsrp_threshold_2s included in the COMMON_UPLINK_INFORMATION of the selected uplink. The first rsrp_threshold_2 is the rsrp_threshold_2 in the first entry of the list of one or more rsrp_threshold_2s included in the COMMON_UPLINK_INFORMATION of the selected uplink.

The set of random_access_resources with prach_repetitions set to true is the set of random_access_resources associated with the COMMON_RACH_INFORMATION_PART_2 of which COMBINATION_OF_FEATURES IE comprises prach_repetitionsfield set to true.

The set of random_access_resources without prach_repetitions set to true is the set of random_access_resources associated with the COMMON_RACH_INFORMATION_PART_2 of which COMBINATION_OF_FEATURES IE does not comprise prach_repetitionsfield.

The first PRACH repetition is the PRACH repetition configured with the first number of PRACH repetitions. The second PRACH repetition is the PRACH repetition configured with the second number of PRACH repetitions. The third PRACH repetition is the PRACH repetition configured with the third number of PRACH repetitions. The third number is greater than the second number. The second number is greater than the first number.

A type_2_feature being applicable to the current random access procedure is equivalent to the type_2_feature triggering the current random access procedure.

In 2A-17, UE selects a set of random_access_resources as below.

For one or more sets of random_access_resources included in the COMMON_UPLINK_INFORMATION of the selected uplink, UE determines whether a set of random_access_resources is available for feature or not as below one by one.
/1: if redCap field is set to true for a set of random_access_resources:
//2: UE considers the set of random_access_resources as not available for a random access procedure for which RedCap is not applicable. (the set of random_access_resources is available for a random access procedure for which RedCap is applicable).
/1: if smallData field is set to true for a set of random_access_resources:
//2: UE considers the set of random_access_resources as not available for the random access procedure which is not triggered for SDT. (the set of random_access_resources is available only for a random access procedure which is triggered for SDT).
/1: if NSAG-List IE is configured for a set of random_access_resources:
//2: UE considers the set of random_access_resources as not available for the random access procedure unless it is triggered for any one of the NSAG-ID(s) in the NSAG-List.
/1: if msg3_repetitions field is set to true for a set of random_access_resources:
//2: UE considers the set of random_access_resources as not available for the random access procedure if Msg3 repetition is not applicable. (the set of random_access_resources is available only for a random access procedure for which Msg3 is applicable).
/1: if prach_repetitions is set to true for a set of random_access_resources,
//2: UE consider the set of random_access_resources as not available for the random access procedure if PRACH repetition is not applicable. (or UE consider the set of random_access_resources as not available for the random access procedure unless it is triggered for any number of PRACH repetition)
/1: if a set of random_access_resources is not configured with COMBINATION_OF_FEATURES (i.e. COMBINATION_OF_FEATURES IE is not present for the set of random_access_resources):
//2: UE considers the set of random_access_resources to not associated with any feature.

UE selects a set of random_access_resources for the triggered random access procedure as below.
/1: If one or more of the features including RedCap and/or Slicing and/or SDT and/or MSG3 repetition and/or PRACH repetition is applicable for this random access procedure, and //2: if none of the sets of random_access_resources are available for any feature applicable to the current random access procedure,
///3: UE selects the set(s) of random_access_resources that are not associated with any feature indication for this random access procedure.
//2: else if there is one set of random_access_resources available which can be used for indicating all features triggering this random access procedure,
///3: UE selects this set of random_access_resources for this random access procedure.
//2: else if there are more than one set of random_access_resources available which can be used for indicating all features triggering this random access procedure (This can occur if PRACH repetition feature is configured with more than one repetition numbers.)
///3: UE select a set of random_access_resources from the available set(s) of random_access_resources based on repetition numbers and rsrp_threshold_2s and RSRP of downlink pathloss reference.
////4: if Prach_Repetition_selection_condition for the first PRACH repetition is fulfilled,
/////5: UE selects, among more than one sets of random_access_resources available for all features triggering this random access procedure, the set of random_access_resources for which first PRACH repetition is configured, (i.e. the set of random_access_resources for which number_of_prach_repetitions field indicates the lowest value).
////4: if Prach_Repetition_selection_condition for the second PRACH repetition is fulfilled,
/////5: UE selects, among more than one sets of random_access_resources available for all features triggering this random access procedure, the set of random_access_resources for which second PRACH repetition is configured, (i.e. the set of random_access_resources for which number_of_prach_repetitions field indicates the second lowest value).
////4: if Prach_Repetition_selection_condition for the third PRACH repetition is fulfilled,
/////5: UE selects, among more than one sets of random_access_resources available for all features triggering this random access procedure, the set of random_access_resources for which third PRACH repetition is configured, (i.e. the set of random_access_resources for which number_of_prach_repetitions field indicates the highest value).
//2: else if there are more than one set of random_access_resources available that are configured with indication(s) for a subset of all features triggering this random access procedure,
///3: UE select a set of random_access_resources from the available set(s) of random_access_resources based on the priority order of this random access Procedure.

If there are more than one set of random_access_resources available that are configured with indication(s) for a subset of all features triggering this random access procedure, UE selects a set of random_access_resources as below.
/1: among the available sets of random_access_resources for this random access procedure, UE identifies those configured with a feature which has the highest priority assigned in PRIORITY_OF_FEATURES and in PRIORITY_OF_FEATURES_EXTENSION among all the features applicable to this random access procedure.
/1: if a single set of random_access_resources is identified:
//2: UE selects this set of random_access_resources.
/1: else if more than one set of random_access_resources is identified:
//2: UE repeats the procedure taking as an input the identified sets of random_access_resources and the feature applicable to the current random access procedure with the highest priority assigned in PRIORITY_OF_FEATURES among all the features applicable to this random access procedure, except the features considered already.
/1: else (i.e. no set of random_access_resources is identified):
//2: UE repeats the procedure taking as an input the previous identified available sets of random_access_resources and the feature applicable to the current random access procedure with the highest priority assigned in PRIORITY_OF_FEATURES and in PRIORITY_OF_FEATURES_EXTENSION among all the features applicable to this random access procedure, except the features considered already.

In 2A-19, UE selects a SSB based on a rsrp_threshold_3.
/1: If the random access is triggered for a msg1-based SI request.
//2: UE uses the rsrp_thresdhol_3 of the default COMMON_RACH_INFORMATION_PART_1; or
//2: UE uses the rsrp_thresdhold_3 of the COMMON_RACH_INFORMATION_PART_2 associated with features indicated in COMBINATION_OF_FEATURES IE in rach-configuration_for_si field.
/1: If the random access is triggered for a msg3-based SI request or for a one or more type_1_features
//2: If the selected set of resources is associated with a COMMON_RACH_INFORMATION_PART_2,
///3: UE uses the rsrp_threshold_3 of the selected COMMON_RACH_INFORMATION_PART_2.
//2: If the selected set of resources is not associated with any feature,
///3: UE uses the rsrp_threshold_3 of the default COMMON_RACH_INFORMATION_PART_1.

If at least one of the SSBs with SS-RSRP above rsrp-thresholdSSB is available, UE selects an SSB with SS-RSRP above rsrp-ThresholdSSB.

In 2A-21, UE selects preamble group based on the selected COMMON_RACH_INFORMATION_PART2.

64 preambles are defined in total. They can be divided into two groups. UE having large data and being in a good channel condition can select Preamble Group B so that GNB can allocate bigger UL grant. UE having smaller data or being in a bad channel condition can select Preamble Group A so that GNB can allocate normal UL grant.

If the potential Msg3 size (UL data available for transmission plus MAC subheader(s) and, where required, MAC CEs) is greater than ra_MSG3_size_group_a and the pathloss is less than PCMAX (of the Serving Cell performing the Random Access Procedure)-preamble_TARGET_power-offset_PREAMBLE_msg3-message_POWER_offset_group_b, UE select the Random Access Preamble group B.

If the random access procedure was initiated for the CCCH logical channel and the CCCH SDU size plus MAC subheader is greater than ra_MSG3_size_group_a, UE selects the Random Access Preamble group B.

If the random access procedure was not initiated for the CCCH logical channel, and If the potential Msg3 size (UL data available for transmission plus MAC subheader(s) and, where required, MAC CEs) is not greater than ra_MSG3_size_group_a, UE selects the Random Access Preamble group A.

If the random access procedure was initiated for the CCCH logical channel, and If the potential Msg3 size (UL data available for transmission plus MAC subheader(s) and, where required, MAC CEs) is not greater than ra_MSG3_size_group_a, UE selects the Random Access Preamble group A.

If the random access procedure was not initiated for the CCCH logical channel, and If the potential Msg3 size (UL data available for transmission plus MAC subheader(s) and, where required, MAC CEs) is greater than ra_MSG3_size_group_a, and the pathloss is not less than PCMAX (of the Serving Cell performing the Random Access Procedure)-preamble_TARGET_power-offset_PREAMBLE_msg3-message_POWER_offset_group_b, UE select the Random Access Preamble group A.

A preamble_target_power could be included in a GENERIC_RACH_INFORMATION. The preamble_target_power is associated with a one or more COMMON_RACH_INFORMATION_PART_2s that are included in the same COMMON_RACH_INFORMATION as the GENERIC_RACH_INFORMATION is.

A PREAMBLE_target_power is a common parameter for one or more sets of random_access_resources.

UE applies a PREAMBLE_target_power indicated in a GENERIC_RACH_INFORMATION to preamble_TARGET_power for preamble group selection. The GENERIC_RACH_INFORMATION is included in the same COMMON_RACH_INFORMATION as the COMMON_RACH_INFORMATION_PART_2 corresponding to the selected set of random_access_resources.

An offset_preamble_msg3 could be included in the COMMON_PUSCH_INFORMATION and an offset_preamble could be included in COMMON_RACH_INFORMATION_PART_2.

In a COMMON_UPLINK_BWP_INFORMATION for an uplink, one offset_preamble_msg3 and zero or more offset_preamble could be present.

An OFFSET_preamble_msg3 is a common parameter for one or more sets of random_access_resources.

An OFFSET_preamble is a dedicted parameter for a set of random_access_resources.

/1: If an offset_preamble is present in the COMMON_RACH_INFORMATION_PART_2 of the selected set of random_access_resource,
//2: UE applies the OFFSET_preamble to offset_PREAMBLE_msg3 for preamble group selection.
/1: If an offset_preamble is absent in the COMMON_RACH_INFORMATION_PART_2 of the selected set of random_access_resources, or
/1: if the selected set of random_access_resources is associated with a default COMMON_RACH_INFORMATION,
//2: UE applies to offset_PREAMBLE_msg3 OFFSET_preamb_msg3 in the COMMON_PUSCH_INFORMATION for preamble group selection.

A message_power_offset_group_b and a number_of_preambles_group_a and a ra_msg3_size_group_a (hereafter field group for preamble group) are present or absent collectively. If preamble group b is configured, field group for preamble group is present. If preamble group b is not configured, field group for preamble group is absent.

A field group for preamble group could be included in a COMMON_RACH_INFORMATION_PART_1. A field group for preamble group could be included in a COMMON_RACH_INFORMATION_PART_2.

In a COMMON_UPLINK_BWP_INFORMATION for an uplink, zero or more field group for preamble group could be present.

A field group for preamble group in a COMMON_RACH_INFORMATION_PART_1 is dedicated to a specific set of random_access_procedure. The specifics set of random_access_procedure is the set of random_access_procedure associated with no feature.

A field group for preamble group in a COMMON_RACH_INFORMATION_PART_2 is dedicated to a specific set of random_access_procedure. The specifics set of random_access_procedure is the set of random_access_procedure associated with the features indicated in the COMMON_RACH_INFORMATION_PART_2.

/1: If a message_power_offset_group_b and a number_of_ preambles_group_a and a ra_msg3_size_group_a are present in the COMMON_RACH_INFORMATION_ PART_2 of the selected set of random_access_resource,
//2: UE applies MESSAGE_power_offset_group_b and NUMBER_of_preambles_group_a and RA_msg3_size_group_a in the COMMON_RACH_INFORMATION_PART_2 for preamble group selection.
/1: If a message_power_offset_group_b and a number_of_ preambles_group_a and a ra_msg3_size_group_a are present in the COMMON_RACH_INFORMATION_ PART_1 and
/1: if the selected set of random_access_resrouces is not associated with any feature (i.e. not associated with any COMMON_RACH_INFORMATION_PART_2),
//2: UE applies MESSAGE_power_offset_group_b and NUMBER_of_preambles_group_a and RA_msg3_size_group_a in the COMMON_RACH_INFORMATION_PART_1 for preamble group selection.

In 2A-23, UE transmits the selected preamble in the selected PRACH occasion in the selected uplink.

UE sets preamble_RECEIVED_target_power to preamble_TARGET_power+delta_PREAMBLE+(preamble_POWER_ramping_counter−1)×power_RAMPING_step+power_OFFSET_2step_ra.

UE sets the transmission power of the preamble to the sum of preamble_RECEIVED_target_power and the pathloss of DL pathloss reference.

UE applies a PREAMBLE_target_power and a POWER_ramping_step indicated in a GENERIC_RACH_INFORMATION to preamble_TARGET_power and power_RAMPING_step for preamble transmission power determination. The GENERIC_RACH_INFORMATION is included in the same COMMON_RACH_INFORMATION as the COMMON_RACH_INFORMATION_PART_2 corresponding to the selected set of random_access_resources.

UE sets delta_PREAMBLE according to the preamble format determined from a PRACH_configuration.

The PRACH_configuration is indicated in the GENERIC_RACH_INFORMATION in the same COMMON_RACH_INFORMATION as the COMMON_RACH_INFORMATION_PART_2 corresponding to the selected set of random_access_resources.

delta_PREAMBLE is predefined for each preamble format and subcarrier spacing.

TABLE 1

| Preamble Format | DELTA_PREAMBLE values (dB) |
|---|---|
| A1 | $8 + 3 \times \mu$ |
| A2 | $5 + 3 \times \mu$ |
| A3 | $3 + 3 \times \mu$ |
| B1 | $8 + 3 \times \mu$ |
| B2 | $5 + 3 \times \mu$ |
| B3 | $3 + 3 \times \mu$ |
| B4 | $3 \times \mu$ |
| C0 | $11 + 3 \times \mu$ |
| C2 | $5 + 3 \times \mu$ | where $\mu$ is the sub-carrier spacing configuration determined by MSG1_subcarrier_spacing in a COMMON_RACH_INFORMATION_PART_1 and the preamble formats are given by a PRACH_configuration in a GENERIC_RACH_INFORMATION.

The GENERIC_RACH_INFORMATION is GENERIC_RACH_INFORMATION included in the same COMMON_RACH_INFORMATION as the COMMON_RACH_INFORMATION_PART_2 corresponding to the selected set of random_access_resources.

The COMMON_RACH_INFORMATION_PART_1 is COMMON_RACH_INFORMATION_PART_1 included in the same COMMON_RACH_INFORMATION as the COMMON_RACH_INFORMATION_PART_2 corresponding to the selected set of random_access_resources.

In 2A-25, UE receives RAR including an uplink grant.

To receive RAR, UE start the Msg2-Window at the first PDCCH occasion from the end of the Random Access Preamble transmission. UE monitors the PDCCH of the SpCell for Random Access Response(s) identified by the RA-RNTI while the Msg2-Window is running.

UE configures Msg2-Window with MSG2_window_length in a GENERIC_RACH_INFORMATION. The GENERIC_RACH_INFORMATION is included in the same COMMON_RACH_INFORMATION as the COMMON_RACH_INFORMATION_PART_2 corresponding to the selected set of random_access_resources.

In monitoring PDCCH, UE applies searchSpace indicated by ra-SearchSpace.

A set of PDCCH candidates for a UE to monitor is defined in terms of PDCCH search space sets. A search space set can be a CSS (Common Search Space) set or a USS (UE Search Space) set. A UE monitors PDCCH candidates in the search spaces set configured by a ra-SearchSpace in COMMON_PDCCH_INFORMATION.

UE consider Random Access Response reception is successful if the Random Access Response contains a MAC subPDU with Random Access Preamble identifier corresponding to the transmitted preamble_INDEX.

The MAC subPDU contains a MAC RAR. The MAC RAR includes fields like Timing Advance Command, Uplink Grant and Temporary C-RNTI. The Timing Advance Command field indicates the index value used to control the amount of timing adjustment that UE has to apply. The size of the Timing Advance Command field is 12 bits. UE adjusts the uplink transmission timing based on the Timing Advance Command field and starts the timeAlignmentTimer. The timeAlignmentTimer is set to timeAlignmentTimerCommon, and the same timeAlignmentTimerCommon is applied to all feature combinations of an uplink. The Uplink Grant field indicates the resources to be used on the uplink. The size of the UL Grant field is 27 bits. The Temporary C-RNTI field indicates the temporary identity that is used by UE during Random Access. The size of the Temporary C-RNTI field is 16 bits In 2A-27, UE performs Msg3 transmission at the determined slot according to the UL grant in the received RAR.

If the selected set of random_access_resource is associated with msg3-repetition feature, UE determines the number of repetitions based on the value indicated in UL grant in the RAR. For example, if 2 MSB of MCS field in UL grant is 01, the number of repetitions is indicated by number_of_msg3_repetitions_list in COMMON_UPLINK_BWP_INFORMATION.

UE determines the PUSCH transmission power by summing offset, pathloss and other parameters related with number of PRBs and power control commands.

offset is sum of PREAMBLE_target_power and OFFSET_ preamble_msg3.

/1: If an offset_preamble is present in the COMMON_RACH_INFORMATION_PART_2 of the selected set of random_access_resource,
//2: UE applies the OFFSET_preamble to offset_PREAMBLE_msg3 for preamble group selection.
/1: If an offset_preamble is absent in the COMMON_RACH_INFORMATION_PART_2 of the selected set of random_access_resources, or
/1: if the selected set of random_access_resources is associated with a default COMMON_RACH_INFORMATION,
//2: UE applies to offset_PREAMBLE_msg3 OFFSET_preamb_msg3 in the COMMON_PUSCH_INFORMATION for preamble group selection.

UE applies a PREAMBLE_target_power indicated in a GENERIC_RACH_INFORMATION to preamble_TARGET_power for preamble group selection. The GENERIC_RACH_INFORMATION is included in the same COMMON_RACH_INFORMATION as the COMMON_RACH_INFORMATION_PART_2 corresponding to the selected set of random_access_resources.

GNB receives the Msg3 and process RRC message included in Msg3. If RRC message requesting connection setup, GNB performs call admission control and act upon the result.

In steps 2A-29, UE receives Msg4 from the base station. Msg4 includes a downlink RRC control message such as RRCSetup.

UE receives a DCI in PDCCH addressed by a temporary C-RNTI. The DCI includes a Time domain resource assignment field. The temporary C-RNTI is assigned to UE in the RAR To receives the DCI in PDCCH addressed by the temporary C-RNTI, UE applies searchSpace indicated by ra-SearchSpace. UE monitors PDCCH while the Contention_Resolution_Timer is running.

The length of the Contention_Resolution_Timer is configured by RA-contention_resolution_timer in a GENERIC_RACH_INFORMATION.

The GENERIC_RACH_INFORMATION is included in the same COMMON_RACH_INFORMATION as the COMMON_RACH_INFORMATION_PART_2 corresponding to the selected set of random_access_resources.

The terminal performs followings.

The terminal receives from a base station a system information. The system information comprises a one or more first container and a second container. Each of the one or more first container (COMMON_RACH_INFORMATION) comprises a third container (GENERIC_RACH_IN- FORMATION) and zero or one or more fourth container (COMMON_RACH_INFORMATION_PART_2).

The terminal triggers a random access procedure for a one or more type1 features.

The terminal determines whether a first type2 feature (Msg3-repetition) is applicable for the random access procedure based on a second RSRP threshold (rsrp_threshold_4). The second RSRP threshold is included in a second container (COMMON_UPLINK_BWP_INFORMATION).

The terminal determines whether a second type2 feature (PRACH repetition) is applicable for the random access procedure based on a specific third RSRP threshold (rsrp_thresdhold_2). The specific third RSRP threshold is the highest third RSRP threshold from a one or more third RSRP thresholds included in the second container (COMMON_UPLINK_BWP_INFORMATION).

The terminal selects, from a one or more available sets of random access resources, a set of random access resources for the random access procedure based on the one or more type1 features that triggers the random access procedure and a one or more type2 features that is applicable to the random access procedure.

The terminal selects, from a one or more fourth containers, a fourth container (COMMON_RACH_INFORMATION_PART_2) for the random access procedure based on the features for the random access procedure and a first information (COMBINATION_OF_FEATURES) in the fourth container.

The terminal selects a set of random_access_resources that can be used for all type1 features and type2 features for this random access procedure.

The terminal selects, based on the one or more third RSRP thresholds, a set of random_access_resources from a one or more sets of random_access_resources if the one or more sets of random_access_resources are available for all type1 features and type2 features for this random access procedure.

The terminal performs PRACH transmission based on a set of random access resources. The set of random access resources are indicated in the selected fourth container and a first container associated with the fourth container.

The terminal determines the preamble resource for PRACH transmission from the selected fourth container.

The terminal determines the time resource and the frequency resource for PRACH transmission from the first container associated with the fourth container.

The terminal determines the number of PRACH repetitions base on a second information (number_of_prach_repetitions) in the fourth container.

An IE may contain one or more fields and IEs. In that sense, an IE can be regarded as a container.

A container contains one or more child fields and child containers. Presence of a (child/downstream) fields under a (parent/upstream) container is determined by the presence of the (parent/upstream) container. A (child/downstream) field associated with a (parent/upstream) container (i.e. a field under a container) is absent if the associated (parent/upstream) container is absent. A (child/downstream) field associated with a container may be present if the associated (parent/upstream) container is present. Presence of a container affects presence of fields under the container.

Presence of a field under a container A is not affected by presence of container B unless the container B is contained in the container A or vice versa.

Container A and container B do not affect each other in terms of presence unless the container B is contained in the container A or vice versa. Presence of a container does not affect the presence of the other container in the same level.

For example, presence of 1E-11 does not affect the presence of 1E-41. presence of a field under 1E-21 is affected by presence of 1E-21. presence of a field under 1E-21 is not affected by presence of 1E-31.

In another embodiment, the terminal performs followings.

/1: The terminal receives a system information.
//2: The system information comprises following fields and IEs.
///3: a COMMON_UPLINK_BWP_INFORMATION for the initial uplink BWP.
////4: one or more common_rach_information
/1: The terminal triggers a random access procedure for a one or more features.
//2: The terminal determines that the one or more features are applicable for the triggered random access procedure.
/1: The terminal selects an uplink based on a rsrp_thresdhold_1 (rsrp_thresdhold_1) in a common_rach_information (RACH_Config_Common)
//2: The common_rach_information is the common_rach_information located first in the common_uplink_BWP_information.
/1: The terminal determines, based on a one or more rsrp_threshold_2(rsrp_threshold_2) in a common_uplink_BWP_information (COMMON_UPLINK_BWP_INFORMATION) of a first BWP, whether PRACH repetition is applicable for the random access procedure and the number of PRACH repetitions.
//2: The rsrp_threshold_2 is related to PRACH repetition.
///3: one or more rsrp_threshold_2 are mandatorily present in a common_uplink_BWP_information of a BWP if at least one set of random_access_resources with PRACH repetition is configured for the BWP. Otherwise, rsrp_threshold_2 is absent in the common_uplink_BWP_information
////4: That a set of random_access_resources with PRACH repetition is configured for a BWP is that one or more COMMON_RACH_INFORMATION_PART_2s in the common_uplink_BWP_information of the BWP are associated with PRACH repetition.
////4: That a COMMON_RACH_INFORMATION_PART_2 is associated with PRACH repetition is that the combination_of_features IE in the COMMON_RACH_INFORMATION_PART_2 includes a prach_repetitionsfield set to true.
///3: The terminal determines based on a first rsrp_threshold_2 whether set(s) of random_access_resources_MsgL_Rep_1 can be used for the random access procedure.
////4: set of random_access_resources_MsgL_Rep_1 is set of random_access_resources configured with x times of PRACH repetitions (i.e. prach_repetitionsfield in the corresponding COMBINATION_OF_FEATURES is set to true and NUMBER_OF_PRACH_REPETITIONS field in the corresponding COMMON_RACH_INFORMATION_PART_2 is set to x)
///3: The terminal determines based on the first rsrp_threshold_2 and the second rsrp_threshold_2 whether set(s) of random_access_resources_Msg1_Rep_2 can be used for the random access procedure.
////4: set of random_access_resources_Msg1_Rep_2 is set of random_access_resources configured with y times of PRACH repetitions (i.e. prach_repetitionsfield in the corresponding COMBINATION_OF_FEATURES is set to true and NUMBER_OF_PRACH_REPETITIONS field in the corresponding COMMON_RACH_INFORMATION_PART_2 is set to y)

///3: The terminal determines based on a last rsrp_threshold_2 whether set(s) of random_access_resources_Msg1_Rep_highest can be used for the random access procedure.

////4: set of random_access_resources_Msg1_Rep_highest is set of random_access_resources configured with z times of PRACH repetitions (i.e. prach_repetitionsfield in the corresponding COMBINATION_OF_FEATURES is set to true and NUMBER_OF_PRACH_REPETITIONS field in the corresponding COMMON_RACH_INFORMATION_PART_2 is set to z) while z is the highest repetition number configured in the set(s) of random_access_resources of the first BWP.

/1: The terminal selects a set of random_access_resources available which can be used for all features triggering this random access procedure.

//2: a feature triggering a random access procedure is equivalent to the feature applicable to the random access procedure.

//2: the set of random_access_resources is associated with a COMMON_RACH_INFORMATION_PART_1 and a COMMON_RACH_INFORMATION_PART_2.

//2: COMBINATION_OF_FEATURES in the COMMON_RACH_INFORMATION_PART_2 associated with the set of random_access_resources indicates exactly same features as the features that triggered this random access procedure.

/1: The terminal selects a first SSB based on a rsrp_threshold_3 (rsrp_threshold_3).

//2: The rsrp_threshold_3 (rsrp_threshold_3) is indicated in the COMMON_RACH_INFORMATION_PART_2 corresponding to the selected set of random_access_resources.

//2: the first SSB is the SSB used for the first set of preamble transmissions.

///3: the first set of preamble transmissions is the consecutive transmissions of the preamble in the PRACH occasions . . .

/1: The terminal selects a first random access Preambles group based on a preamble_target_power (preamble_target_power) and an offset_preamble_msg3 (offset_preamble_msg3).

//2: The first random access Preambles group is the random access Preambles group used for the first set of preamble transmissions.

/1: The terminal selects a first random access Preamble randomly with equal probability from the random access Preambles associated with the first SSB and the first random access Preambles group and the first set of random_access_resources.

//2: The first set of random_access_resources is the set of random_access_resources selected for this random access procedure.

/1: The terminal determines the next available n consecutive PRACH occasions based on prach_configuration_number of the first set of random_access_resources //2: prach_configuration_number is indicated in the COMMON_RACH_INFORMATION_PART_1 associated with the selected set of random_access_resources.

/1: The terminal determines the transmission power for preamble based on preamble_targetLpower and DELTA_FOR_PRACH_TRANSMISSION /1: The terminal transmits the first preamble in the n consecutive PRACH occasions determined from prach_configuration_number /1: The terminal starts the Msg2_window at the first PDCCH occasion from the end of the first random access Preamble transmission //2: The length of Msg2_window is determined from Msg2_window_length and priority_of_prach_repetitions.

//2: During the Msg2_window, the terminal monitors PDCCH for one or more RA-RNTIs. The number of RA-RNTIs to be monitored during the Msg2_window is equal to msgL_repetitions.

>The terminal selects a second SSB, if RAR is not received during the Msg2_window, based on /1: The terminal selects a second SSB based on the rsrp_threshold_3 (rsrp_threshold_3). The second SSB can be different from the first SSB.

/1: The terminal selects a second random access Preamble randomly with equal probability from the random access Preambles associated with the second SSB and the first random access Preambles group /1: The terminal transmits the second preamble in the n consecutive PRACH occasions In another embodiment, the terminal performs followings.

The terminal receives from a base station a system information. The system information comprises a one or more first container and a second container. Each of the one or more first container (COMMON_RACH_INFORMATION) comprises a third container (GENERIC_RACH_INFORMATION) and zero or one or more fourth container (COMMON_RACH_INFORMATION_PART_2).

The terminal triggers a random access procedure for a one or more features.

The terminal determines whether one or more type2 features are applicable for the random access procedure.

The terminal determines whether a first type2 feature (Msg-3 repetition) is applicable based on a second RSRP threshold (rsrp_threshold_4). The second RSRP threshold is included in a second container (COMMON_UPLINK_BWP_INFORMATION).

The terminal determines whether a second type2 feature (PRACH repetition) is applicable for the random access procedure based on a specific third RSRP threshold (rsrp_thresdhold_2). The specific third RSRP threshold is the highest third RSRP threshold from a one or more third RSRP thresholds included in the second container (COMMON_UPLINK_BWP_INFORMATION).

The terminal selects a set of random access resources for the random access procedure based on the one or more features that triggers the random access procedure.

The terminal selects SSB based on a rsrp_threshold_3 in COMMON_RACH_INFORMATION_PART_2 or in COMMON_RACH_INFORMATION_PART_1.

SSB is selected based on a rsrp_threshold_3 in a COMMON_RACH_INFORMATION_PART_2 if the selected set of random access resources is associated with the COMMON_RACH_INFORMATION_PART_2.

SSB is selected based on a rsrp_threshold_3 in COMMON_RACH_INFORMATION_PART_1 of default COMMON_RACH_INFORMATION if the selected set of random access resources is associated with no features.

The terminal selects a preamble group for PRACH transmission based on a preamble_target_power and a offset_preamble or a preamble_target_power and a offset_preamble_msg3.

If the selected set of random access resources is associated with no features, preamble group is selected based on the preamble_target_power in the COMMON_RACH_INFORMATION_PART_1 of default COMMON_RACH_INFORMATION and the offset_preamble_msg3 in the COMMON_PUSCH_INFORMATION.

If the selected set of random access resources is associated with a COMMON_RACH_INFORMATION_PART_2 (with one or more features) and if a offset_preamble is included in the COMMON_RACH_INFORMATION_PART_2, preamble group is selected based on the preamble_target_power in the COMMON_RACH_INFORMATION_PART_1 associated with the COMMON_RACH_INFORMATION_PART_2 and the offset_preamble in the COMMON_RACH_INFORMATION_ PART_2.

If the selected set of random access resources is associated with a COMMON_RACH_INFORMATION_PART_2 (with one or more features) and if a offset_preamble is not included in the COMMON_RACH_INFORMATION_PART_2, preamble group is selected based on the preamble_target_power in the COMMON_RACH_INFORMATION_PART_1 associated with the COMMON_RACH_INFORMATION_PART_2 and offset_preamble_msg3 in the COMMON_PUSCH_INFORMATION.

The terminal determines the transmission power of the preamble.

preamble transmission power is determined based on a preamble_target_power and a prach_configuration.

If the selected set of random access resources is associated with no features, preamble transmission power is determined based on the preamble_target_power and the prach_configuration in the COMMON_RACH_INFORMATION_PART_1 of default COMMON_RACH_INFORMATION.

If the selected set of random access resources is associated with a COMMON_RACH_INFORMATION_PART_2 (with one or more features), preamble transmission power is determined based on the preamble_target_power and prach_configuration in the COMMON_RACH_INFORMATION_PART_1 associated with the COMMON_RACH_INFORMATION_PART_2.

The terminal transmits the preamble in a frequency resources one or more times.

If the selected set of random access resources is associated with no features, the specific time/frequency resource is determined based on a fdm_for_prach and a frequency_start_for_prach in the COMMON_RACH_INFORMATION_ PART_1 of default COMMON_RACH_INFORMATION.

If the selected set of random access resources is associated with a COMMON_RACH_INFORMATION_PART_2 (with one or more features), the specific time/frequency resource is determined based on a fdm_for_prach and a frequency_start_for_prach in the COMMON_RACH_INFORMATION_PART_1 associated with the COMMON_RACH_INFORMATION_PART_2.

If the selected set of random access resources is associated with no features, the terminal transmits the preamble with the determined transmission power only one time.

If the selected set of random access resources is associated with a COMMON_RACH_INFORMATION_PART_2 (with one or more features) and if the COMMON_RACH_INFORMATION_PART_2 is configured with number_of_prach_repetitions, the terminal transmits the preamble with the determined transmission power n times.

The terminal monitors PDCCH for RAR reception while a Msg2-Window is running.

If the selected set of random access resources is associated with no features, length of the Msg2-Window is set by a msg2_window_length in the COMMON_RACH_INFORMATION_PART_1 of default COMMON_RACH_INFORMATION.

If the selected set of random access resources is associated with a COMMON_RACH_INFORMATION_PART_2 (with one or more features), length of the Msg2-Window is set by a msg2_window_length in the COMMON_RACH_INFORMATION_PART_1 associated with the COMMON_RACH_INFORMATION_PART_2.

The terminal receives a valid RAR.

The terminal transmits a Msg3.

The transmission power of the Msg3 is determined based on a preamble_target_power and a offset_preamble or a preamble_target_power and a offset_preamble_msg3.

If the selected set of random access resources is associated with no features, transmission power of the Msg3 is determined based on the preamble_target_power in the COMMON_RACH_INFORMATION_PART_1 of default COMMON_RACH_INFORMATION and the offset_preamble_msg3 in the COMMON_PUSCH_INFORMATION.

If the selected set of random access resources is associated with a COMMON_RACH_INFORMATION_PART_2 (with one or more features) and if a offset_preamble is included in the COMMON_RACH_INFORMATION_PART_2, transmission power of the Msg3 is determined based on the preamble_target_power in the COMMON_RACH_INFORMATION_PART_1 associated with the COMMON_RACH_INFORMATION_PART_2 and the offset_preamble in the COMMON_RACH_INFORMATION_PART_2.

If the selected set of random access resources is associated with a COMMON_RACH_INFORMATION_PART_2 (with one or more features) and if a offset_preamble is not included in the COMMON_RACH_INFORMATION_PART_2, transmission power of the Msg3 is determined based on the preamble_target_power in the COMMON_RACH_INFORMATION_PART_1 associated with the COMMON_RACH_INFORMATION_PART_2 and offset_preamble_msg3 in the COMMON_PUSCH_INFORMATION.

The terminal receives a Msg4 before a Contention_Resolution_Timer expires.

If the selected set of random access resources is associated with no features, length of the Contention_Resolution_Timer is set by a ra-contention_resolution_timer in the COMMON_RACH_INFORMATION_PART_1 of default COMMON_RACH_INFORMATION.

If the selected set of random access resources is associated with a COMMON_RACH_INFORMATION_PART_2 (with one or more features), length of the Contention_Resolution_Timer is set by a ra-contention_resolution_timer in the COMMON_RACH_INFORMATION_PART_1 associated with the COMMON_RACH_INFORMATION_PART_2.

Coverage enhancement may be achieved by configuring various communication resources and protocols as described herein. For example, PRACH preamble repetition (e.g., msg1 repetition) and PUSCH repetition (e.g., msg3 repetition) may be used for a four-step random access procedure. For PRACH preamble repetition, multiple PRACH preamble may be transmitted within one RACH attempt. For configuring PRACH preamble repetition (e.g., msg1 repetition), one or more additional RACH configurations may be used. In each of the one or more additional RACH configurations, one or more feature combination preamble parameters (e.g., FeatureCombinationPreambles, FeatureCombinationPreamblesList, FeatureCombination, etc.) may be configured.

The wireless device (e.g., the UE, the terminal, etc.) described herein may comprise a transceiver comprising at least one antenna, a memory storing instructions, and a controller configured to execute the instructions. The controller may be configured to execute the instructions to cause the wireless device to receive system information block 1 (SIB1) message of a cell. The SIB1 message may indicate a plurality of configuration parameters comprising a common uplink configuration of an uplink bandwidth part (BWP). The common uplink configuration of the uplink BWP may comprise: a common random access channel (RACH) configuration, a first threshold for determining whether to select a resource associated with a physical random access channel (PRACH) preamble repetition number, a second threshold for determining whether to select a resource associated with message (msg3) repetition, and a second RACH configuration associated with feature combination. The second RACH configuration may indicate the PRACH preamble repetition number. The controller may be configured to execute the instructions to cause the wireless device to determine, based on the first threshold and based on the PRACH preamble repetition number, a repetition number for PRACH preamble transmission, and repeatedly transmit, based on the determined repetition number, a PRACH preamble of a random access procedure associated with the second RACH configuration.

The second RACH configuration associated with feature combination may comprise at least one feature combination preamble parameter, and a first feature combination preamble parameter of the at least one feature combination preamble parameter may indicate at least one preamble repetition parameter associated with feature combination of the first feature combination preamble parameter. The at least one preamble repetition parameter may comprise at least one message 1 (msg1) repetition number, and the first feature combination preamble parameter may indicate at least one feature that is part of the feature combination of the first feature combination preamble parameter. The at least one feature that is part of the feature combination of the first feature combination preamble parameter may comprise msg1 repetition. The at least one feature that is part of the feature combination of the first feature combination preamble parameter may further comprise at least one of: message 3 (msg3) repetition; reduced capability (redCap); or small data transmission (SDT).

The at least one preamble repetition parameter of the first feature combination preamble parameter may indicate at least one PRACH preamble repetition number selected from a set of a plurality of different repetition numbers. The random access procedure may be a four-step random access procedure, and the PRACH preamble repetition number may be associated with the four-step random access procedure. The common uplink configuration of the uplink BWP may be comprised in a common uplink configuration of a normal uplink of the cell different from a common uplink configuration of a supplementary uplink of the cell.

The controller may be configured to execute the instructions to cause the wireless device to: initiate the random access procedure; after transmitting the PRACH preamble a plurality of times, receive a random access response of the random access procedure; after receiving the random access response, repeatedly perform message 3 (msg3) transmission; and after performing the msg3 transmission a plurality of times, receive a message 4 (msg4) of the random access procedure.

The SIB1 message may further indicate: at least one parameter, configured in the second RACH configuration, for determining whether to apply message 3 (msg3) repetition for the random access procedure. The SIB1 message may further indicate: at least one first feature priority field indicating priorities for a first set of features and at least one second feature priority field indicating priorities for a second set of features different from the first set of features. The first set of features may comprise message 3 (msg3) repetition. The second set of features may comprise message 1 (msg1) repetition, and the msg1 repetition may correspond to a PRACH preamble repetition of the random access procedure. The priorities for the first set of features may comprise at least one of: a priority for msg3 repetition; a priority for slicing; a priority for reduced capability (redCap); or a priority for small data transmission (SDT). The priorities for the second set of features may comprise a priority for msg1 repetition. The priority for msg1 repetition may be different from each priority of the priorities for the first set of features.

The second RACH configuration associated with feature combination may comprise: a first feature combination preamble parameter indicating a first preamble repetition parameter associated with feature combination of the first feature combination preamble parameter; and a second feature combination preamble parameter indicating a second preamble repetition parameter associated with feature combination of the second feature combination preamble parameter. The first preamble repetition parameter may comprise a first message 1 (msg1) repetition number. The first feature combination preamble parameter may indicate msg1 repetition feature that is part of the feature combination of the first feature combination preamble parameter. The second preamble repetition parameter may comprise a second msg1 repetition number. The second feature combination preamble parameter may indicate msg1 repetition feature that is part of the feature combination of the second feature combination preamble parameter.

The SIB1 message may further indicate: at least one first feature priority field indicating priorities for a first set of features, and at least one second feature priority field indicating priorities for a second set of features different from the first set of features. The first set of features may comprise message 3 (msg3) repetition. The second set of features may comprise message 1 (msg1) repetition, and the msg1 repetition may correspond to a PRACH preamble repetition of the random access procedure.

A priority for msg1 repetition may be different from the priorities for the first set of features. The at least one second feature priority field may indicate a priority for msg1 repetition. The priority for msg1 repetition may be associated with: the msg1 repetition feature that is part of the feature combination of the first feature combination preamble parameter; and the msg1 repetition feature that is part of the feature combination of the second feature combination preamble parameter. A plurality of msg1 repetition features comprised in different feature combinations may have the same priority value (e.g., one of integer values 0 to 7).

Figure 3A:
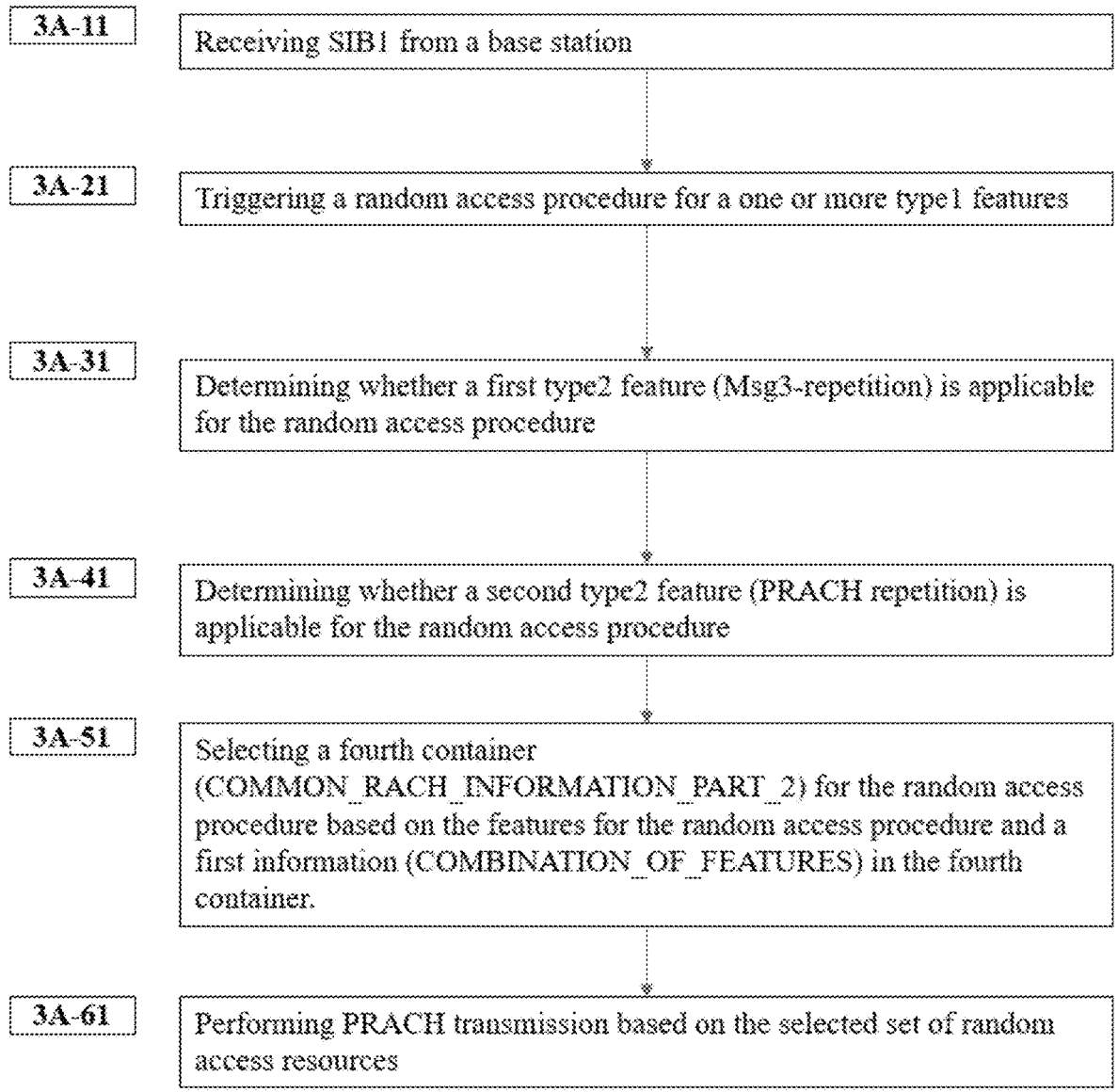
FIG. 3A is a flow diagram illustrating an operation of a terminal.

FIG. 3A illustrates the operation of the terminal.

In 3A-11, the terminal receives from a base station a system information. The system information comprises a one or more first container and a second container. Each of the one or more first container (COMMON_RACH_INFORMATION) comprises a third container (GENERIC_

RACH_INFORMATION) and zero or one or more fourth container (COMMON_RACH_INFORMATION_PART_2).

In 3A-21, the terminal triggers a random access procedure for a one or more type1 features.

In 3A-31, the terminal determines whether a first type2 feature (Msg3-repetition) is applicable for the random access procedure based on a second RSRP threshold (rsrp_threshold_4). The second RSRP threshold is included in a second container (COMMON_UPLINK_BWP_INFORMATION).

In 3A-41, the terminal determines whether a second type2 feature (PRACH repetition) is applicable for the random access procedure based on a specific third RSRP threshold (rsrp_thresdhold_2). The specific third RSRP threshold is the highest third RSRP threshold from a one or more third RSRP thresholds included in the second container (COMMON_UPLINK_BWP_INFORMATION).

In 3A-51, the terminal selects, from a one or more fourth containers, a fourth container (COMMON_RACH_INFORMATION_PART_2) for the random access procedure based on the features for the random access procedure and a first information (COMBINATION_OF_FEATURES) in the fourth container.

In 3A-61, the terminal performs PRACH transmission based on a set of random access resources. The set of random access resources are indicated in the selected fourth container and a first container associated with the fourth container.

The terminal determines the preamble resource for PRACH transmission from the selected fourth container.

The terminal determines the time resource and the frequency resource for PRACH transmission from the first container associated with the fourth container.

Figure 4A:
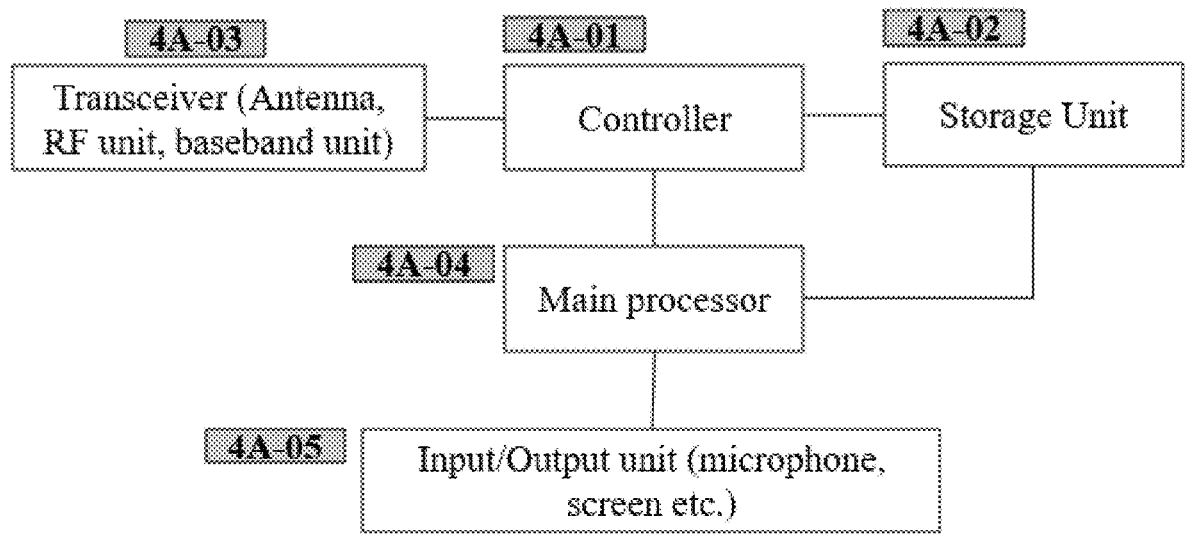
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2A and FIG. 3A are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
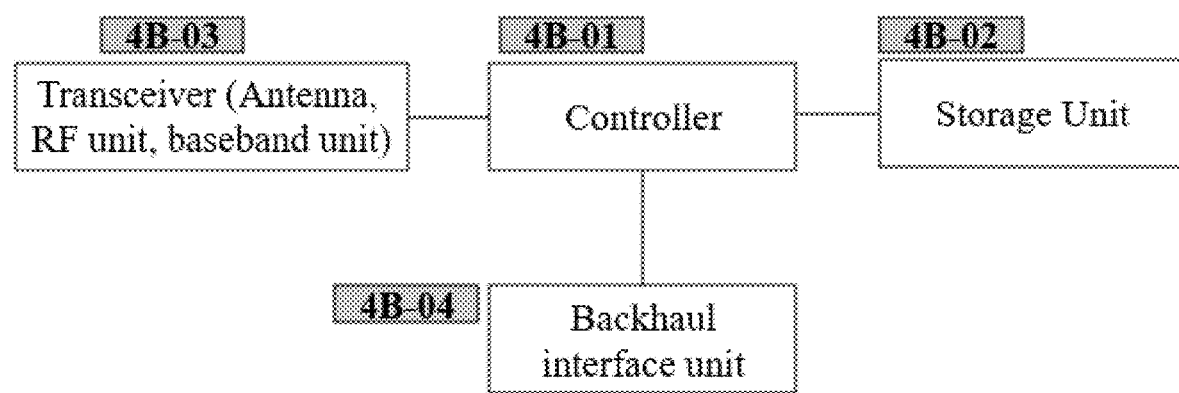
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2A are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

Below table lists acronym used in the present disclosure.

| Acronym | Full name | Acronym | Full name |
|---|---|---|---|
| 5GC | 5G Core Network | RACH | Random Access Channel |
| ACK | Acknowledgement | RAN | Radio Access Network |
| AM | Acknowledged Mode | RAR | Random Access Response |
| AMF | Access and Mobility Management Function | RA-RNTI | Random Access RNTI |
| ARQ | Automatic Repeat Request | RAT | Radio Access Technology |
| AS | Access Stratum | RB | Radio Bearer |
| ASN.1 | Abstract Syntax Notation One | RLC | Radio Link Control |
| BSR | Buffer Status Report | RNA | RAN-based Notification Area |
| BWP | Bandwidth Part | RNAU | RAN-based Notification Area Update |
| CA | Carrier Aggregation | RNTI | Radio Network Temporary Identifier |
| CAG | Closed Access Group | RRC | Radio Resource Control |
| CG | Cell Group | RRM | Radio Resource Management |
| C-RNTI | Cell RNTI | RSRP | Reference Signal Received Power |
| CSI | Channel State Information | RSRQ | Reference Signal Received Quality |
| DCI | Downlink Control Information | RSSI | Received Signal Strength Indicator |
| DRB | (user) Data Radio Bearer | SCell | Secondary Cell |
| DTX | Discontinuous Reception | SCS | Subcarrier Spacing |
| HARQ | Hybrid Automatic Repeat Request | SDAP | Service Data Adaptation Protocol |
| IE | Information element | SDU | Service Data Unit |
| LCG | Logical Channel Group | SFN | System Frame Number |
| MAC | Medium Access Control | S-GW | Serving Gateway |
| MIB | Master Information Block | SI | System Information |
| NAS | Non-Access Stratum | SIB | System Information Block |
| NG-RAN | NG Radio Access Network | SpCell | Special Cell |
| NR | NR Radio Access | SRB | Signalling Radio Bearer |
| PBR | Prioritised Bit Rate | SRS | Sounding Reference Signal |
| PCell | Primary Cell | SS | Search Space |
| PCI | Physical Cell Identifier | SSB | SS/PBCH block |
| PDCCH | Physical Downlink Control Channel | SSS | Secondary Synchronisation Signal |
| PDCP | Packet Data Convergence Protocol | SUL | Supplementary Uplink |
| PDSCH | Physical Downlink Shared Channel | TM | Transparent Mode |
| PDU | Protocol Data Unit | UCI | Uplink Control Information |
| PHR | Power Headroom Report | UE | User Equipment |
| PLMN | Public Land Mobile Network | UM | Unacknowledged Mode |
| PRACH | Physical Random Access Channel | CRP | Cell Reselection Priority |
| PRB | Physical Resource Block | FPP | First positioning protocol |
| PSS | Primary Synchronisation Signal | SPP | Second positioning protocol |
| PUCCH | Physical Uplink Control Channel | DL-PRS | Downlink-Positioning Reference Signal |
| PUSCH | Physical Uplink Shared Channel | SL-PRS | Sidelink-Positioning Reference Signal |
| DL-AoD | Downlink Angle-of-Departure | | |
| GNSS | Global Navigation Satellite System | | |

What is claimed is:

1. A wireless device comprising:
a transceiver comprising at least one antenna;
a memory storing instructions; and
a controller configured to execute the instructions to cause the wireless device to: receive system information block 1 (SIB1) message of a cell, wherein the SIB1 message indicates a plurality of configuration parameters comprising a common uplink configuration of an uplink bandwidth part (BWP), wherein the common uplink configuration of the uplink BWP comprises:
a common random access channel (RACH) configuration;
a first threshold for determining whether to select a resource associated with a physical random access channel (PRACH) preamble repetition number;
a second threshold for determining whether to select a resource associated with message 3 (msg3) repetition;
a second RACH configuration associated with feature combination, wherein the second RACH configuration indicates the PRACH preamble repetition number; and
a third RACH configuration associated with feature combination, wherein the third RACH configuration indicates the PRACH preamble repetition number, and wherein the SIB1 message further indicates:

at least one first feature priority field indicating priorities for a first set of features, wherein the first set of features comprises msg3 repetition; and at least one second feature priority field, distinct from the at least one first feature priority field, indicating priorities for a second set of features different from the first set of features, wherein the second set of features comprises message 1 (msg1) repetition, and wherein the msg] repetition corresponds to PRACH preamble repetition; determine, based on the first threshold and based on the PRACH preamble repetition number, a repetition number for PRACH preamble transmission associated with the second RACH configuration; and repeatedly transmit, based on the determined repetition number, a PRACH preamble of a random access procedure associated with the second RACH configuration;

wherein the random access procedure is a four-step random access procedure, and wherein the PRACH preamble repetition number is associated with the four-step random access procedure.

2. The wireless device of claim 1, wherein the second RACH configuration associated with feature combination comprises at least one feature combination preamble parameter, and wherein a first feature combination preamble parameter of the at least one feature combination preamble parameter indicates at least one preamble repetition parameter associated with feature combination of the first feature combination preamble parameter.

3. The wireless device of claim 2, wherein the at least one preamble repetition parameter comprises at least one message 1 (msg1) repetition number, and wherein the first feature combination preamble parameter indicates at least one feature that is part of the feature combination of the first feature combination preamble parameter.

4. The wireless device of claim 3, wherein the at least one feature that is part of the feature combination of the first feature combination preamble parameter comprises msg1 repetition.

5. The wireless device of claim 4, wherein the at least one feature that is part of the feature combination of the first feature combination preamble parameter further comprises at least one of:
msg3 repetition;
reduced capability (redCap); or
small data transmission (SDT).

6. The wireless device of claim 2, wherein the at least one preamble repetition parameter of the first feature combination preamble parameter indicates at least one PRACH preamble repetition number selected from a set of a plurality of different repetition numbers.

7. The wireless device of claim 1, wherein the common uplink configuration of the uplink BWP is comprised in a common uplink configuration of a normal uplink of the cell different from a common uplink configuration of a supplementary uplink of the cell.

8. The wireless device of claim 1, wherein the controller is configured to execute the instructions to cause the wireless device to:
initiate the random access procedure;
after transmitting the PRACH preamble a plurality of times, receive a random access response of the random access procedure;

after receiving the random access response, repeatedly perform message 3 (msg3) transmission; and after performing the msg3 transmission a plurality of times, receive a message 4 (msg4) of the random access procedure.

9. The wireless device of claim 1, wherein the SIB1 message further indicates:
at least one parameter, configured in the second RACH configuration, for determining whether to apply msg3 repetition for the random access procedure.

10. The wireless device of claim 1, wherein the priorities for the first set of features comprise at least one of:
a priority for msg3 repetition;
a priority for slicing;
a priority for reduced capability (redCap); or
a priority for small data transmission (SDT).

11. The wireless device of claim 1, wherein the priorities for the second set of features comprise a priority for msg1 repetition.

12. The wireless device of claim 11, wherein the priority for msg1 repetition is different from the priorities for the first set of features.

13. The wireless device of claim 1, wherein the second RACH configuration associated with feature combination comprises:
a first feature combination preamble parameter indicating a first preamble repetition parameter associated with feature combination of the first feature combination preamble parameter; and
a second feature combination preamble parameter indicating a second preamble repetition parameter associated with feature combination of the second feature combination preamble parameter.

14. The wireless device of claim 13, wherein the first preamble repetition parameter comprises a first message 1 (msg1) repetition number,
wherein the first feature combination preamble parameter indicates msg1 repetition feature that is part of the feature combination of the first feature combination preamble parameter,
wherein the second preamble repetition parameter comprises a second msg1 repetition number,
wherein the second feature combination preamble parameter indicates msg1 repetition feature that is part of the feature combination of the second feature combination preamble parameter.

15. The wireless device of claim 14, wherein the SIB1 message further indicates:
at least one first feature priority field indicating priorities for a first set of features, wherein the first set of features comprises message 3 (msg3) repetition; and
at least one second feature priority field indicating priorities for a second set of features different from the first set of features, wherein the second set of features comprises message 1 (msg1) repetition, and wherein the msg1 repetition corresponds to a PRACH preamble repetition of the random access procedure.

16. The wireless device of claim 15, wherein a priority for msg1 repetition is different from the priorities for the first set of features.

17. The wireless device of claim 15, wherein the at least one second feature priority field indicates a priority for msg1 repetition, and
wherein the priority for msg1 repetition is associated with:

the msg1 repetition feature that is part of the feature combination of the first feature combination preamble parameter; and the msg1 repetition feature that is part of the feature combination of the second feature combination preamble parameter.

\* \* \* \* \*